United States Patent [19]

Wingrove, Jr.

[11] 4,340,904
[45] Jul. 20, 1982

[54] AUTOMATIC GRAY SCALE TRACKING SYSTEM FOR CATHODE RAY DISPLAY DEVICES

[75] Inventor: Earl R. Wingrove, Jr., North Syracuse, N.Y.

[73] Assignee: General Electric Company, Syracuse, N.Y.

[21] Appl. No.: 219,826

[22] Filed: Dec. 24, 1980

[51] Int. Cl.³ .............................................. H04N 9/535
[52] U.S. Cl. ........ .................................. 358/29; 358/10; 358/34
[58] Field of Search ............................. 358/10, 29, 34; 315/13 R, 383

[56] References Cited

U.S. PATENT DOCUMENTS

| | | | |
|---|---|---|---|
| 3,927,346 | 12/1975 | Spannhake | 358/29 |
| 4,012,775 | 3/1977 | Smith | 358/29 |
| 4,014,038 | 3/1977 | Hwang et al. | 358/29 |
| 4,200,882 | 4/1980 | Janssen | 358/29 |
| 4,207,592 | 6/1980 | Harwood | 358/34 |
| 4,277,798 | 7/1981 | Hinn | 358/34 |

OTHER PUBLICATIONS

IEEE Transactions on Consumer Electronics, "Automatic Stabilization of Background Color in Color TV Receiver" by P. J. H. Janssen et al., Feb. 1977, pp. 8–12.

*Primary Examiner*—Richard Murray
*Attorney, Agent, or Firm*—Richard V. Lang; Carl W. Baker

[57] ABSTRACT

Apparatus is provided for achieving and maintaining gray scale tracking in a multibeam, cathode ray display device, despite fluctuations in the electrical characteristics of the display device and of video amplifiers driving the device. Tracking is accomplished by measuring the actual beam currents produced during the applications of test signals to the amplifiers and automatically adjusting the biases and gains of the amplifiers in response to differences between the measured beam currents and predefined beam currents which should be produced. The invention can also be used to automatically stabilize the beam current in a single beam cathode ray display device.

15 Claims, 31 Drawing Figures

AUTOMATIC GRAY SCALE TRACKING SYSTEM FOR CATHODE RAY DISPLAY DEVICES

BACKGROUND OF THE INVENTION

1. Field of the Invention

The present invention relates to cathode ray display devices and in particular to the preservation of predetermined relationships between video signals applied to the devices and electron beam currents produced therein.

2. Description of the Prior Art

Conventional image display apparatus, such as color televison receivers employing multibeam cathode ray display devices, are provided with potentiometers for adjusting the biases and the gains of video amplifiers driving electron gun cathodes producing the electron beams. These potentiometers are factory adjusted to present neutral gray images when a video signal representing a gray image of any intensity is applied to the video amplifiers. The bias adjustments, made while a video signal representing a low intensity gray image is applied, establish the output voltages of the video amplifiers at magnitudes which cause the production of low magnitude electron beam currents having predefined ratios resulting in a low intensity gray image. At other image intensities, the ratios of these beam currents must be maintained to achieve gray scale tracking. The gain adjustments, made while a video signal representing a higher intensity gray image is applied, set the gains of the amplifiers to compensate for differences in the transconductances of the respective cathodes driven thereby and establish individual transfer functions such that the predefined ratios of the beam currents are maintained at all intensities.

Adjusting the biases and gains of the video amplifiers, as described above, accomplishes more than the production of neutral gray images. It also causes the beam currents to be maintained at predefined magnitudes for any given hue, saturation level and intensity represented by a video signal applied to the video amplifiers. Maintaining gray scale tracking is essential for the accurate representation of color images.

Although control of the biases and gains of the video amplifiers is an effective manner of achieving and maintaining gray scale tracking, control by manual adjustment of potentiometers suffers a major disadvantage—lack of permanency. The electrical characteristics of the cathode ray devices drift with age, change with cathode temperature and are susceptible to changes caused by mechanical shock. Also, the output voltages of the video amplifiers vary with temperature and the supply voltage. Thus, continual bias and gain readjustment is necessary if degradation of color quality is to be avoided.

Continual bias and gain readjustment is also necessary in single beam image display apparatus such as monochromatic television receivers. Here readjustment is necessary to maintain initially established relationships between video signal magnitude and image intensity.

Circuitry is known for automatically adjusting beam current in a CRT and thus eliminating the need for manual adjustments. The known circuitry works upon the premise that the beam current produced by each cathode in the CRT is equal to the cathode current itself. This is not realistic because it fails to account for leakage current which often exists in CRTs. The magnitude of this leakage current, which varies with the temperatures and voltages of the CRT device elements between which it flows (typically, the cathode, the heater filament and a control electrode adjacent to the cathode), can be substantial with respect to the beam current, even for high magnitude beam currents. The error in ignoring leakage current becomes most apparent at low beam currents, however, because the leakage component of the cathode current increases as the beam current is decreased. At the lowest beam currents the leakage current component can become orders of magnitude larger than the beam current component. This large error at low beam currents is particularly objectionable in the display of color images because the eye is most sensitive to color abnormalities at low image intensities. It is also objectionable in the display of monochromatic images because the eye is most sensitive to intensity abnormalities at the dark level. Thus, beam current control circuitry which does not take such leakage current into account cannot adequately maintain gray scale tracking.

SUMMARY OF THE INVENTION

It is an object of the present invention to provide circuitry for automatically achieving and maintaining gray scale tracking in a multibeam color cathode ray display device.

It is another object of the present invention to provide such circuitry which maintains gray scale tracking despite fluctuations in the electrical characteristics of the display device and amplifiers driving the device.

It is a further object of the present invention to provide such circuitry which controls the amplifiers in response to the magnitudes of the actual beam currents produced by the cathodes, even in the presence of substantial cathode leakage current.

It is yet another object of the present invention to provide circuitry for automatically achieving and maintaining an established relationship between applied video signals and image intensity in a single beam cathode ray display device.

These and other objects of the invention are achieved by circuitry which periodically adjusts the biases and the gains of video amplifiers driving the electron guns of the display device. During intervals, designated as test periods, when the beams are sweeping a region of the device which is not utilized to produce a visible image, test signals which should ideally effect the production of beam currents of predetermined magnitudes are applied to the amplifiers. The cathode currents produced in response to each test signal are sampled twice, once with the beam currents flowing and once with them blanked (cut off). Beam blanking is accomplished by depressing the voltage on an accelerating electrode in the path of each beam.

The beam current produced by each cathode is measured by taking the difference between the two cathode currents sampled. The leakage current components of the two cathode currents are substantially identical and cancel without causing any significant error in the beam current measurement. These components are identical because the temperature and voltages of the display device elements contributing to leakage current are constant throughout each test period. At the end of each test period the measured beam currents are compared with the predetermined magnitudes. If the beam current produced by any cathode is not equal to the predetermined magnitude with which it is compared, either the bias or the gain of the amplifier driving that cathode is automatically adjusted to reduce the inequality.

The type of adjustment (bias/gain) made in each test period depends on the type of test signal applied to the video amplifiers during the period. A bias test signal, representing a video signal intended to effect production of a first set of electron beam currents of predefined low magnitudes corresponding to a gray image of low intensity is applied to the video amplifiers during test periods in which bias adjustments are made. A gain test signal representing a video signal intended to effect production of a second set of electron beam currents of predefined intermediate magnitudes corresponding to a gray image of intermediate intensity is applied to the video amplifiers during test periods in which gain adjustments are made.

In the case of a single beam display device, operation of the invention is identical, but only one beam current is measured rather than a set of currents. Also, the test signal represents only image intensity.

DESCRIPTION OF PREFERRED EMBODIMENTS

First Embodiment

Figure 1:
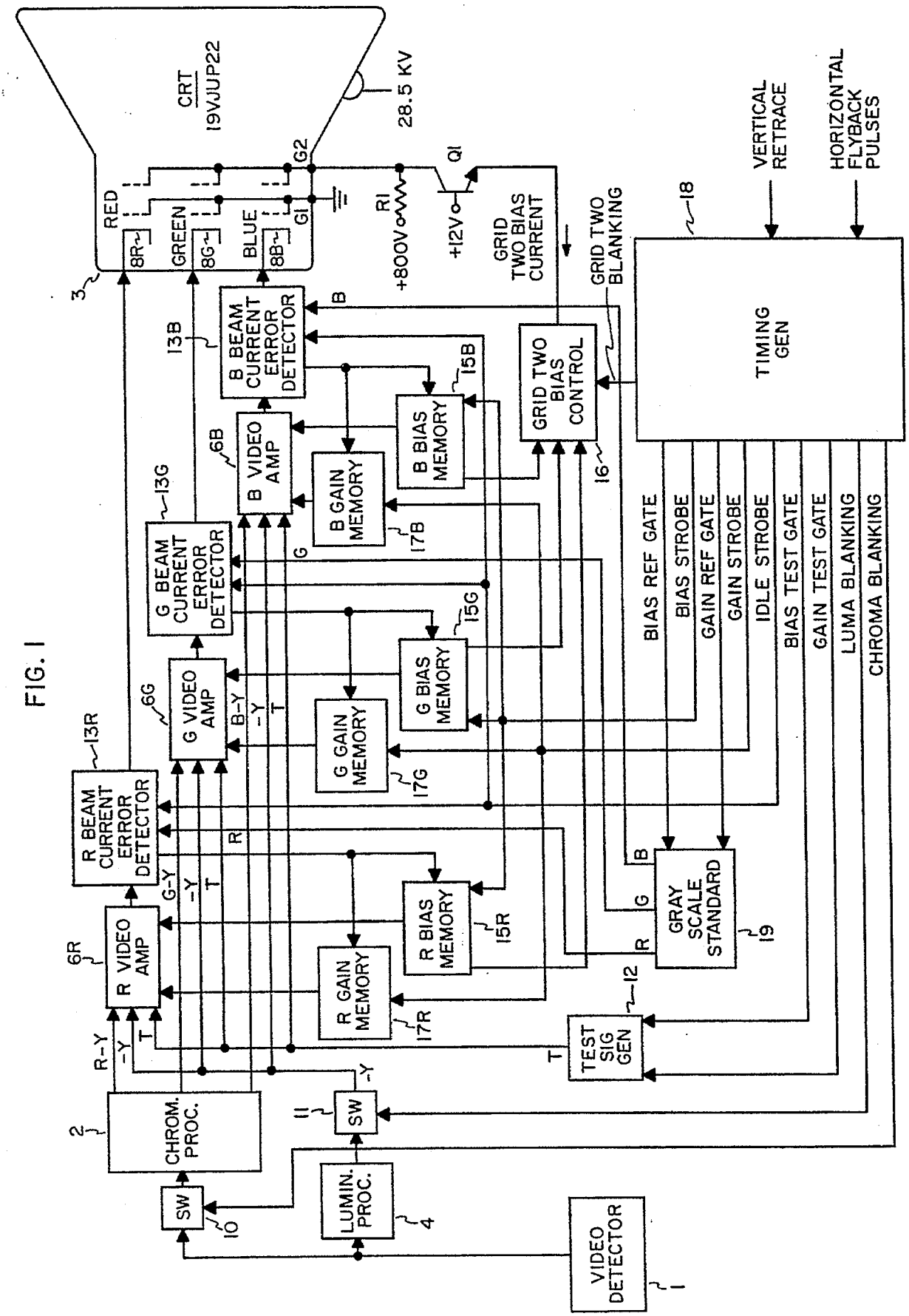
FIG. 1 is a block diagram of a first embodiment of the automatic gray scale tracking system in which the video amplifier and cathode ray tube gun in each color channel of a color television receiver are controlled so that the beam currents are corrected against respective current standards.

A first embodiment of an automatic gray scale tracking system for use in the video section of a color television receiver is illustrated in FIG. 1. The function of the video section of a conventional color television receiver is to convert the detected R-Y, G-Y, B-Y, -Y video signals which are combined and amplified to provide red, green and blue color signals for driving the separate guns of the cathode ray display device 3.

The video section illustrated in FIG. 1 receives the composite video signal from the conventional video detector 1 and utilizes a conventional chrominance processor 2 and luminance processor 4 to produce the component video signals. These component signals are applied to video amplifiers 6R, 6G, 6B, in three separate color channels, which drive the cathodes 8R, 8G, 8B of red, green, blue guns in the CRT. Gray scale tracking is effected by utilizing a chrominance blanking switch 10; a luminance blanking switch 11; a test signal generator 12; beam current error detectors 13R, 13G, 13B; bias memories 15R, 15G, 15B; a grid two bias control 16; gain memories 17R, 17G, 17B; a timing generator 18; a gray scale standard 19; and a bias control/beam blanking transistor Q1. All of the above-recited elements identified by indicia including the letters R, G, B are included in the red, green, blue channels, respectively. All of the remaining elements are used with all three channels.

The video section functions in the following manner to provide the separate red, green, blue signals for driving the red, green, blue guns of the cathode ray tube. The detected video signal is coupled from the video detector 1 through the chrominance blanking switch 10 (which is under the control of the timing generator 18) to the chrominance processor 2. The detected video signal is also coupled to the luminance processor 4 whose output is coupled to the input of the luminance blanking switch 11, which is also under the control of the timing generator 18. The chrominance processor 2 produces the R-Y, G-Y and B-Y color difference signals and applies them to inputs of the red, green, blue video amplifiers 6R, 6G, 6B, respectively. The luminance processor 4 produces the luminance signal -Y and applies it to a second input of each of the video amplifiers 6R, 6G, 6B. These signals are then algebraically combined in the video amplifiers 6R, 6G, 6B to provide the red, the green and the blue color signals, respectively.

In addition to the component R-Y, G-Y, B-Y, -Y video signals just described, a test signal T, for achieving the gray scale tracking, is multiplexed with the video signals and applied to the second input of each of the video amplifiers 6R, 6G, 6B. The test signal is repeatedly produced by the test signal generator 12 during successive, alternately occurring test periods designated bias test periods and gain test periods. During each bias test period, the test signal generator produces a low level bias test signal which nominally effects the production of a set of electron beam currents of predefined low magnitudes (on the order of 10 microamperes). These beam currents correspond to those which would cause presentation of a low intensity, gray picture on the CRT screen. During each gain test period the test signal generator produces an intermediate level gain test signal which nominally effects the production of a set of electron beam currents of predefined intermediate magnitudes (on the order of 320 microamperes). These beam currents correspond to those which would cause presentation of an intermediate intensity, gray picture on the CRT screen.

The timing of the bias and gain test periods is controlled by bias and test gate signals produced by the timing generator 18. The test periods are timed to occur after vertical retrace in successive fields as illustrated in FIGS. 2A-2P. This timing has been selected to avoid interference with the formation of the image presented on the CRT. During each test period, luma blanking and chroma blanking signals (FIGS. 2D and 2E) are applied by the timing generator 18 to the switches 11, 10 to interrupt application of the component video signals to the video amplifiers. Note that the chroma blanking signal (as well as an idle strobe signal illustrated in FIG. 2F) are continually interrupted during horizontal flyback (FIG. 2B). The interruptions in the chroma blanking signal enable periodically-occurring chroma bursts in the detected video signal to pass to the chrominance processor 2. The simultaneously-occurring interruptions in the idle strobe signal momentarily stop testing by the error detectors 13R, 13B, 13G so that they do not detect deviations in the video amplifier outputs caused by the chroma bursts. The test periods must be long enough to permit application of the test signals to the inputs of the video amplifiers, the derivation of error signals from the error detector, their application in a feedback loop back to the video amplifier for bias and gain adjustments, and time for these adjustments to stabilize.

The video amplifiers 6R, 6G, 6B, in addition to combining the color difference signals with the luminance signal to obtain the individual color signals, must also respond to bias adjustments by the respective bias memories (15R, 15G, 15B) and must respond to gain adjustments by the respective gain memories. The bias adjustment of each video amplifier is achieved by adjusting the bias current drawn from the amplifier by a current sink included in the respective bias memory. The gain adjustment of each video amplifier is achieved by shunting a gain-determining resistance in the amplifier with an adjustable resistance in the respective gain memory.

The output of each video amplifier (6R, 6G, 6B) drives the cathode (8R, 8G, 8B) of its respective gun through a respective one of the beam current error detectors (13R, 13G, 13B). Each beam current error detector provides unity voltage gain for the color signal produced by its respective video amplifier and provides a low impedance path between the amplifier and the gun driven thereby. The error detectors sense errors in the beam currents and produce error signals utilized to correct these errors.

The cathode ray tube 3 to which amplifiers (6R, 6G, 6B) are coupled is a conventional three gun color tube having electrically independent cathodes (8R, 8G, 8B), a common connection terminal G1 for the first grids in all three guns, and a common connection terminal G2 for the second grids in all three guns. The cathode-driving video amplifiers, operating from a 200 volt supply, establish the potentials of the cathodes. The terminal G1 is normally at ground potential and the terminal G2 is normally at a potential of +800 volts. The latter potential can be reduced by the grid two bias control 18 and by the timing generator 18, as will be explained. The anode potential is 28.5 KV.

In addition to the specification of the foregoing operating voltages for a selected type cathode ray tube, beam current ratios for the individual guns will also be specified to better enable understanding of the invention. In general, phosphors used on the screens of one type of color tube may have differing sensitivities from phosphors employed on the screens of another type. Thus, it is necessary to specify for each type of tube the beam current ratios required to provide a gray image. In one cathode ray tube type, for instance, a hueless or gray image occurs when the red gun generates 37% of the total beam current, the green gun generates 36% of the total beam current and the blue gun generates 27% of the total beam current. These percentages, and thus the ratios of the beam currents, are essentially identical at differing image intensities for a gray image. The percentages vary from tube type to tube type by as much as 50% but they are substantially stable within a given type.

A multibeam cathode ray tube, ideal in respect to gray scale, should have perfect color balance over the entire range of intensities from a very dark image to a very bright image (where colors approach saturation). In accordance with the principal embodiments of the invention, gray scale tracking is designed to occur over the entire range of image intensities, but bias and gain adjustments are made at predefined low beam currents (corresponding to a low intensity image) and at predefined intermediate beam currents (corresponding to an intermediate intensity image). These predefined beam currents were selected because it is over the low to intermediate range of image intensities that the human eye is most sensitive to color abnormalities in general, and to gray scale errors in particular. The beam current error detectors (13R, 13G, 13B) derive, during successive bias and gain test periods, two sets of error signals representing gray scale errors at respectively low and intermediate intensities. The two error signal sets are used to adjust bias and gain control levels stored in the bias and gain memories. The low intensity error signals are used to adjust the bias control levels stored in the bias memories 15R, 15G, 15B. The intermediate intensity error signals are used to adjust the gain control levels stored in the gain memories 17R, 17G, 17B. The bias and gain control levels are utilized by the bias and gain memories to control the biases and gains of the video amplifiers, and the potential at terminal G2, and to thereby achieve continuous gray scale correction.

The processing circuitry of error detectors 13R, 13G, 13B derive the error signals produced thereby, during each test period, by determining the difference between the set of beam currents produced by the electron gun cathodes to which they are coupled and a set of current standards produced by the gray scale standard 19. During each bias test period, the gray scale standard produces a set of bias current standards corresponding to the predefined, low-magnitude beam currents ideally produced when the bias test signal is applied to the video amplifiers. During each gain test period, the gray scale standard produces a set of gain current standards corresponding to the predefined, intermediate-magnitude beam currents ideally produced when the gain test signal is applied to the video amplifiers.

In order to determine the difference between the beam current produced by each electron gun during a given test period, and the current standard $I_{STD}$ therefor, the error detector coupled to the electron gun's cathode twice samples the cathode current during the test period. The first sample $I_1$ is taken while the beam currents are blanked (interrupted) and the second sample $I_2$ is taken while they are not blanked. The difference between the first and second samples $(I_2-I_1)$ is the beam current $I_B$ produced by the gun. The error detector derives the error signal representing the difference between this beam current and the current standard therefor by a two-step process which is repeated during each test period. First, it stores the sample $I_1$ taken when the beam currents are blanked. Second, it combines the two samples and the current standard to form the sum $(I_2-I_1)-I_{STD}$, which is equal to the difference between the beam current and the current standard.

Beam blanking is effected by applying a grid two blanking potential, in the form of a voltage decrease of about 300 volts, to terminal G2. This voltage decrease is provided by the transistor Q1 connected to terminal G2. This terminal is also connected through a resistor R1 to 800 VDC. A grid two blanking signal is applied to the grid two bias control when it is desired to blank the electron beams. In response to this signal, the bias control draws current from the emitter of Q1. This current increases the forward bias of the transistor Q1, thereby increasing the current through R1 sufficiently above that during normal bias of the transistor to effect the requisite decrease in grid two voltage.

In order to extend the bias control range beyond the range permitted by adjusting the bias currents drawn from the video amplifiers (6R, 6G, 6B), the grid two bias control 16 is connected to the G2 circuit of the cathode ray tube. The grid two bias control 16 receives from each of the bias memories 15R, 15G, 15B a voltage proportional to the bias level in the bias memory, and supplies a grid two bias current to the transistor Q1 if the bias level indicates that a further reduction in beam current cannot be effected by further adjusting the bias current of the amplifier. The grid two bias current causes a decrease in the grid two voltage of sufficient magnitude to reduce the electron beam currents to the correct magnitudes.

Additional circuit details of the three color channels (which are substantially identical) will be described by referring to FIG. 3, where one of these channels (blue) has been illustrated in detail, along with certain ancillary circuitry. Timing of the operation of the channel circuitry and the ancillary circuitry will be described by referring to FIGS. 2A–2P, where timing signals utilized to synchronize the test periods with the field and scan lines of the CRT are illustrated.

The illustrations in FIGS. 2A through 2P have a common timing base showing portions of three fields. They show respectively lines 4–16 coincident with vertical retrace (FIG. 2A) of a first field denoted the Gain Test Period A, then lines 4–16 of a second field denoted the Bias Test Period A; and finally lines 4–16 of a third field denoted Gain Test Period B. Fields 1 and 2 are interlaced to form the first frame. Field 3 is the first field of the following frame.

Figure 3:
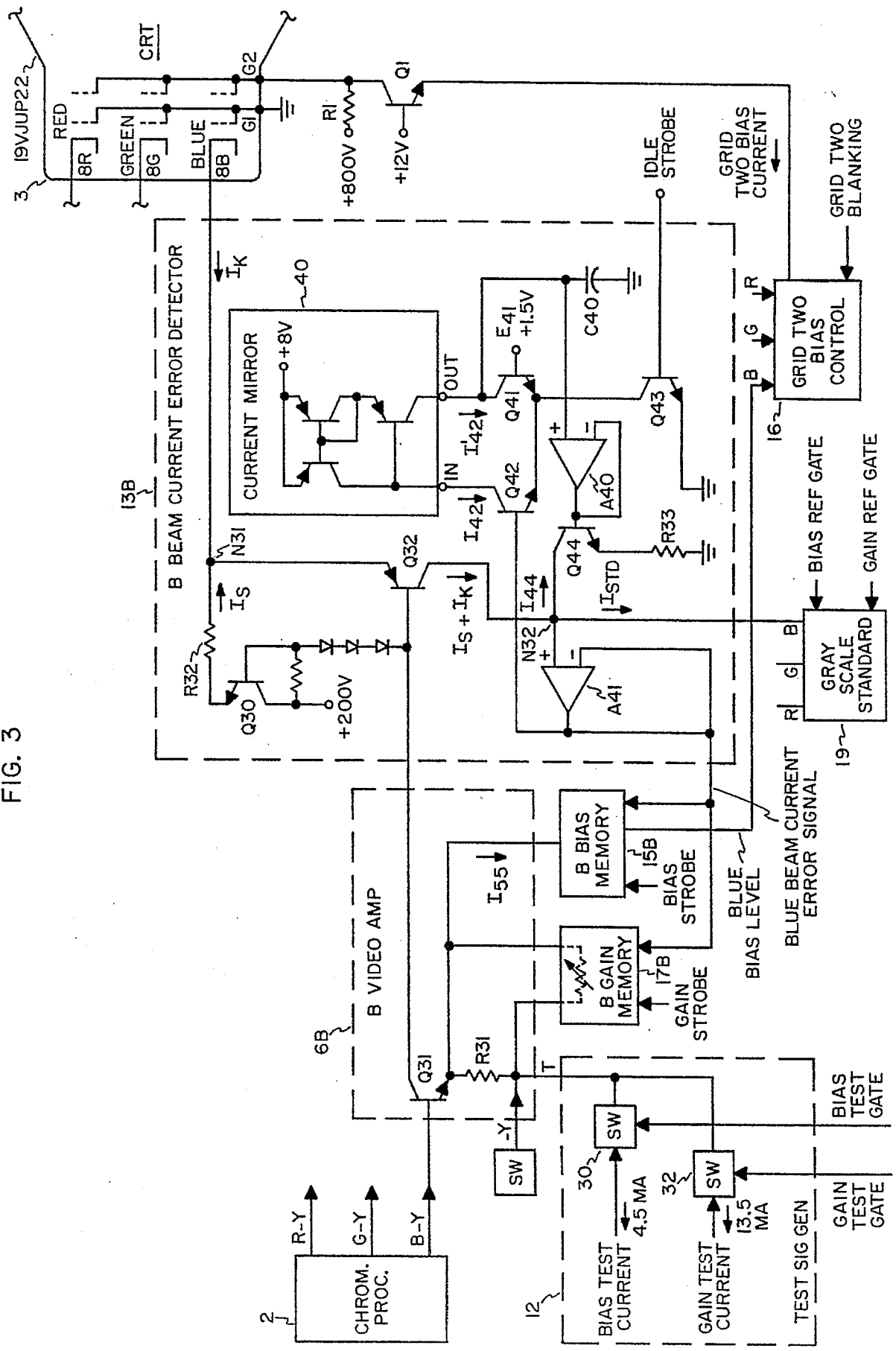
FIG. 3 is a combined schematic illustration and block diagram of the principal elements of one channel and of the common elements of the first embodiment required for correction of the beam current produced by the channel.

Referring to FIG. 3, the B-Y color difference signal and the -Y luminance signal are applied to the blue video amplifier 6B which comprises a single transistor Q31. The B-Y signal is applied to its base and the -Y signal is coupled via a degenerative emitter resistance R31 to its emitter. The test signal generator 12, under the control of the timing generator 18, applies either the bias test signal (a current of 4.5 milliamperes) or the gain test signal (a current of 13.5 milliamperes) to the emitter via the emitter resistance R31 during each test period. The smaller current is selected to divide between the three video amplifiers, in proportion to their effective emitter circuit resistances, and to produce a total beam current of approximately 30 microamperes. The larger current is selected to divide between the amplifiers in like manner and to produce a total beam current of approximately 960 microamperes, assuming that the electron guns have gammas of approximately 2.5.

The test signal generator 12 is of conventional design, consisting of a 4.5 milliampere current source coupled through an electronic switch 30 to the emitter resistance R31 and a 13.5 milliamperes current source coupled through a switch 32 to the resistance R31. The switch 30, associated with the bias test current, is controlled by a bias test gate signal (FIG. 2G) which is produced by the timing generator during lines 4–16 of each bias test period. The switch 32, associated with the gain test current, is controlled by a gain test gate signal (FIG. 2J) which is produced by the timing generator during lines 4–16 of of each gain test period. The bias test gate and gain test gate signals thus permit the bias and gain test signals to be multiplexed into the video amplifier input during vertical retrace when no detected video signals are present, so that there will be no interference with the image presented on the CRT.

The gain of the blue video amplifier 6B is controlled by the blue gain memory 17B which introduces a digitally-adjusted conductance in shunt with the emitter resistance R31, and thus increases the gain of the video amplifier as the shunting resistance is reduced. The level of the bias current of the blue video amplifier is controlled by the blue bias memory 15B which is coupled directly to the emitter of Q31, and which functions as a controllable current sink. The output of the blue video amplifier is derived from the collector of transistor Q31 and is applied to the complementary-symmetry emitter followers Q30, Q32 which are a part of the blue beam current error detector 13B.

Error Detection

The blue beam current error detector couples the blue video amplifier output voltage to the cathode 8B of the blue gun in the CRT, and at the same time senses the blue gun cathode current $I_K$. The blue video amplifier output is coupled directly to the base of the PNP transistor Q32, and through a three diode string to the base of NPN transistor Q30. The emitter of Q30 is coupled through resistance R32 to the blue gun cathode and the emitter of PNP transistor Q32 is directly coupled to the cathode. Transistor Q30 functions to provide a source current $I_S$ which combines with the cathode current $I_K$ at a node N31 to prevent cutoff of transistor Q32 if excessive leakage current in the blue gun causes $I_K$ to reverse direction from that shown. In the case of low leakage currents, cathode current $I_K$ flows into the emitter of Q32 and the transistor remains conducting. Should the cathode current reverse because of excessive leakage current, transistor Q32 is prevented from cutting off by a source current $I_S$ of a magnitude sufficient to exceed the maximum tolerable leakage current for a properly functioning CRT (typically 300 microamperes).

The blue beam current error detector determines both the low intensity error and the intermediate intensity error in the blue beam current during the respective bias and gain test periods. As earlier noted, the error detection process involves taking a first sample of the blue cathode current $I_1$ with the test signal applied and the three beam currents blanked, storing the first sample. Then a second sample of the blue cathode current $I_2$ is taken, with the test signal applied, and with the three beam currents unblanked. The two samples are then combined with the current standard $I_{STD}$ (produced by the gray scale standard 19 for the blue channel) to derive a blue beam current error signal which is utilized to adjust either the bias or gain of the blue video amplifier, and thus effect blue beam current correction.

The first step of the error detection process—taking a first sample of the blue cathode current $I_K$—is carried out during a first portion of each test period. During this portion, the beam currents are blanked and the sampled blue cathode current $I_K$ is equal to the blue gun leakage current $I_L$. This cathode current $I_K$ and the source current $I_S$ are combined to form a current having the magnitude:

$$I_1 = I_S + I_K = I_S + I_L \qquad (1)$$

which is stored for retrieval when the second sample $I_2$ is obtained and summation occurs. The means which performs the storage step includes a buffer amplifier A41, a current mirror 40, a differential amplifier comprising transistors Q41 and Q42, a transistor Q43, and an adjustable current sink, comprising a capacitor C40, a second buffer amplifier A40, a current determinative resistance R33 and a transistor Q44.

The current mirror 40 functions to duplicate a current $I_{42}$ drawn from an input IN by the transistor Q42. The duplicate current is produced at an output OUT as a current $I_{42}'$ having the same polarity and magnitude as current $I_{42}$. The sink actually stores the current $I_1$ by continuously withdrawing a matching current from a node N32. This node is a summing node at which the currents $I_1$, $I_2$ and $I_{STD}$ will be combined to produce the blue beam error signal.

During a first portion of each test period, when the first sample $I_1$ is stored, the gray scale standard is quiescent and does not draw current from node N32. The differential amplifier transistors Q42, Q41 are activated by an idle strobe signal (FIG. 2F) which is applied to Q43 by the timing generator. The current $I_1$ flowing into node N32 tends to be offset by the current $I_{44}$ flowing out of node N32 into Q44. The magnitude of current $I_{44}$ is established by the voltage stored on capacitor C40 (which is applied to the base of Q44 by amplifier A40) and the resistance of resistor R33, in the emitter circuit of Q44. When the differential amplifier Q41, Q42 is active, it functions to establish the voltage on capacitor C40 at the level necessary to equalize the currents $I_1$ and $I_{44}$. The manner in which these currents are equalized is described as follows. If current $I_1$ is equal to current $I_{44}$ an equilibrium condition will exist. The voltage applied to the base of transistor Q42 by amplifier A41 will be equal to a reference voltage E41 applied to the base of transistor Q41, the collector current flowing into transistor Q41 will be identical to that flowing into Q42. Thus, no charging or discharging of capacitor C40 will take place. If the current $I_{44}$ is not equal to current $I_1$, however, the voltage on capacitor C40 will be changed by the circuitry to effect a change in the magnitude of current $I_{44}$. For example, if the magnitude of current $I_{44}$ is less than that of current $I_1$ the collector voltage of transistor Q44 will increase above the level E41 causing the collector current in transistor Q42 to be greater than that in transistor Q41. Thus only part of the current $I_{42}'$ provided by the current mirror will flow into Q41, and current of magnitude $I_{42}' - I_{41}$ (where $I_{41}$ is the collector current in transistor Q41) charges capacitor C40. The capacitor will continue to charge until the voltage thereon increases to the magnitude that will increase current $I_{44}$ to the magnitude of current $I_1$, and establish circuit equilibrium. Conversely, if the magnitude of current $I_{44}$ is larger than that of current $I_1$, the collector voltage of transistor Q44 will decrease below the level E41 effecting discharge of capacitor C40 through transistor Q41 until the voltage on the capacitor decreases to the magnitude necessary to decrease current $I_{44}$ to the magnitude of current $I_1$.

At the end of the first portion of each test period the idle strobe signal is terminated (FIG. 2F) causing Q43 to turn off. This prevents current from flowing through the differential amplifier, causing the currents $I_{41}$ and $I_{42}'$ to go to zero, and prevents the capacitor C40 from charging/discharging from that voltage which establishes the magnitude of current $I_{44}$ equal to that of current $I_1$.

As the second portion of the test period begins the beam currents are unblanked, causing the current $I_S + I_K$ entering node N32 to increase to the magnitude $$I_2 = I_S + I_L + I_B \qquad (2)$$

Current $I_{44}$ having the magnitude $I_1$ is diverted from node N32 by transistor Q44 because of the voltage established on capacitor C40. Also, a bias reference gate (FIG. 2H) or a gain reference gate (FIG. 2K) signal is applied to the gray scale standard 19 causing it to supply to the node a current standard $I_{STD}$ equal to the predefined blue beam current that should nominally be produced while the test signal T is applied to the blue video amplifier 6B by the test signal generator. If a bias test period is occurring (and thus the bias test current is being applied to the blue amplifier) the bias reference gate signal (FIG. 2H) is applied to standard 19 causing the production of a bias current standard corresponding to the predefined, low magnitude blue beam current that should be produced. If a gain test period is occurring (and thus the gain test current is being applied to the blue amplifier) the gain reference gate signal (FIG. 2K) is applied to standard 19 causing the production of a gain current standard corresponding to the predefined, intermediate magnitude blue beam current that should be produced.

The node N32 and the amplifier A41 function as means for summing the three currents entering it and forming the blue beam error signal. The sum of the three currents entering the node is $$(I_2 - I_1) - I_{STD}$$

which, from equations 1 and 2, can be seen to be equal to $$(I_B) - I_{STD}$$

where $I_B$ is the beam current being produced by the blue gun in the CRT and $I_{STD}$ is the current that should be produced by the blue gun. If $I_B$ is equal to $I_{STD}$, the amplifier A41 will produce a voltage (1.5 V) identical to that applied to the base of Q41 (E41 = 1.5 V) indicating that no error exists, and no adjustment will be made to the bias and gain levels stored in the blue bias memory and the blue gain memory respectively. If $I_B$ is not equal to $I_{STD}$, however, the amplifier A41 will produce an error signal in the form of a voltage which indicates the sign of the difference between $I_B$ and $I_{STD}$. This error signal changes either the bias control or the gain control level (depending on whether a bias test period or a gain test period is occurring) causing adjustment of either the bias or the gain of the blue amplifier to correct the blue beam current toward its predefined magnitude. If the blue beam current is larger than $I_{STD}$, the collector voltage of Q44 (and thus the blue beam error signal voltage produced by A41) will increase above $E_{41}$ indicating that the beam current is too high. Conversely, if the blue beam current is smaller than $I_{STD}$, the collector voltage of Q44 (and thus the error signal voltage) will decrease below $E_{41}$ indicating that the beam current is too low.

The manner in which the biases and gains of the blue amplifier 6B are adjusted during successive bias and gain test periods will be described in detail. It should be remembered, however, that the just-described error detection process takes place simultaneously in all three channels, with consequent adjustments of the red and green amplifiers being effected in the same manner as will be described for the blue amplifier. The only significant difference between the error detection processes for the three channels relates to the production of the current standard $I_{STD}$ for each channel. The magnitudes of the bias current standards for the three channels are different, because the predefined low magnitude beam currents nominally produced by the three guns are different, as has been explained. The magnitudes of the gain current standards are likewise different.

Figure 4:
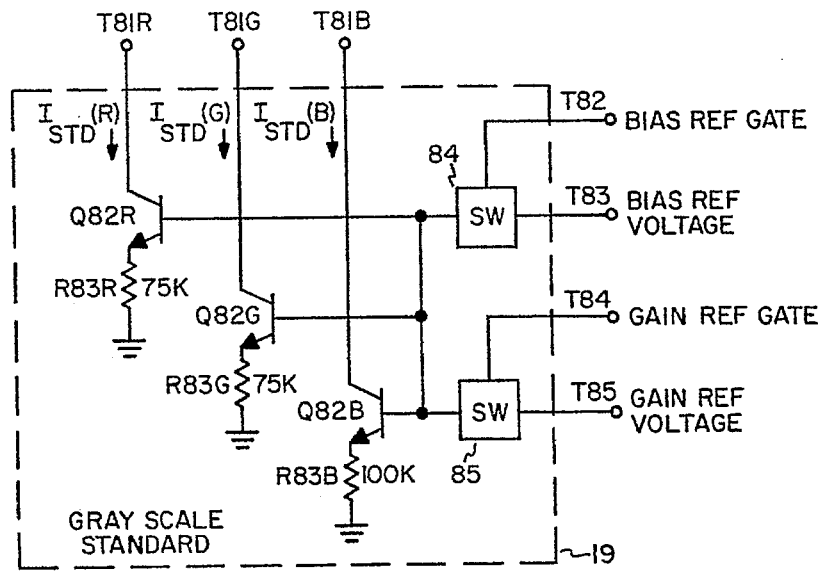
FIG. 4 is a schematic illustration of a gray scale standard for producing the current standards in both the first embodiment and a second embodiment.

The gray scale standard 19 for producing these different currents is illustrated, in one form thereof, in FIG. 4 as comprising three transistors Q82R, Q82G, Q82B and two electronic switches 84, 85. Resistances R83R, R83G and R83B having ratios corresponding to the ratios of the three current standards produced by the standard 19 are connected in series with the emitters of the transistors. The ratios of the bias current standards produced during bias test periods and of the gain current standards produced during gain test periods are identical, because the ratios of the beam currents produced by the red, green and blue guns in the CRT, to effect presentation of a gray image, are identical at all image intensities. In order to produce the bias current standards, a bias reference voltage of appropriate magnitude is applied via a terminal T83 to switch 84, which is closed during the second portion of each bias test period by the bias reference gate signal (FIG. 2H) applied to switch 84 via a terminal T82. In order to produce the gain current standards, a gain reference voltage of appropriate magnitude is applied via a terminal T85 to switch 85 which is closed during the second portion of each gain test period by the gain reference gate signal (FIG. 2K) applied to switch 85 via terminal T84. Table 1, below, lists typical magnitudes for the currents $I_{STD}$ (R), $I_{STD}$(G), $I_{STD}$ (B) and the bias and gain reference voltages. The voltage $V_D = V_S + V_{BE}$, where $V_S$ is the voltage drop of the closed switch (84, 85), through which the reference voltage (gain, bias) is being applied to the three transistors, and $V_{BE}$ is the voltage drop across the base-emitter junction of the transistors.

TABLE 1

| Gray Scale Standard Currents and Voltages | | | | |
|---|---|---|---|---|
| | $I_{STD}$(R) | $I_{STD}$(G) | $I_{STD}$(B) | Reference Voltage Applied |
| Bias Test | 11μA | 11μA | 8μA | .82 + $V_D$ volts |
| Gain Test | 352μA | 352μA | 256μA | 26.2 + $V_D$ volts |

Bias Control

Figure 5:
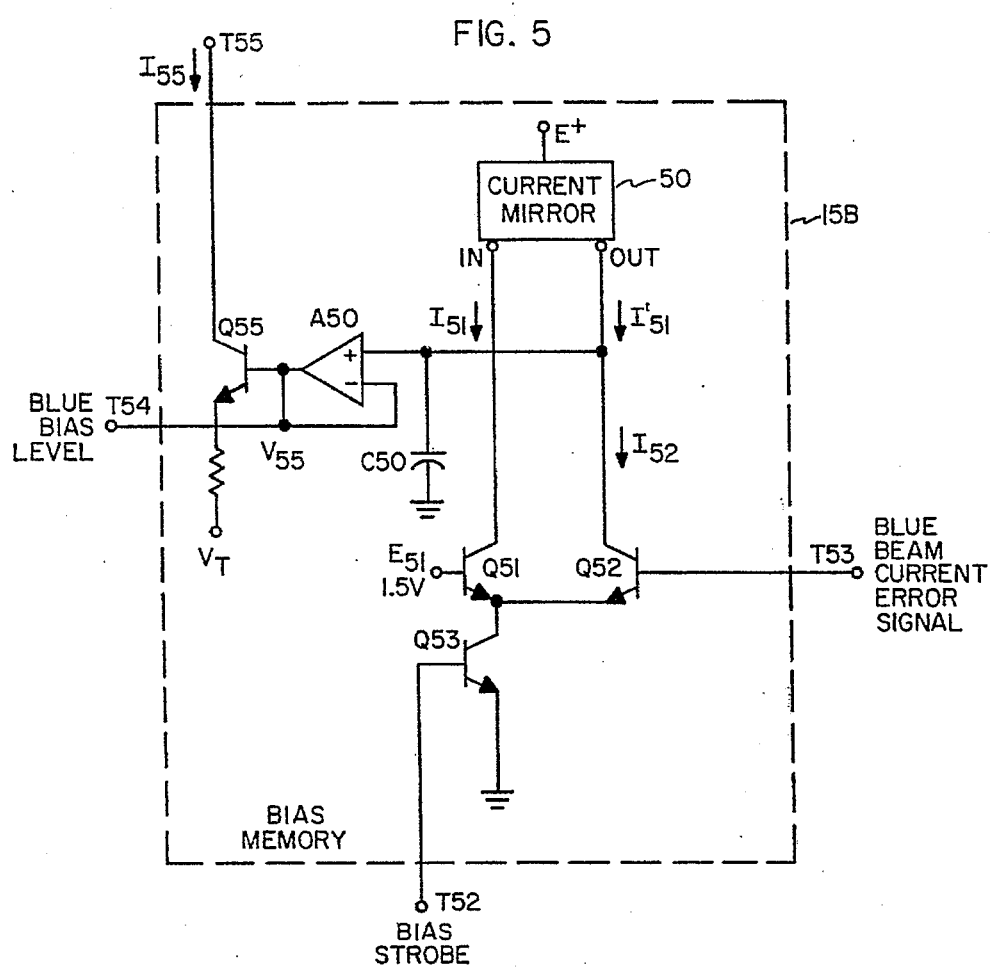
FIG. 5 is a schematic illustration of a bias memory associated with each video amplifier in both embodiments.

The bias memory 15B, utilized with the blue channel, is illustrated in one form thereof in FIG. 5. (The bias memories 15R, 15G utilized with the red and green channels are identical thereto and operate, in their respective channels, in the same manner as will be described for the blue bias memory 15B.) During the second portion of each test period, the blue bias memory receives at a terminal T53 the blue beam error signal produced by the blue beam error detector 13B. If the test period is a bias test period the voltage level of the error signal is compared with a reference voltage $E_{51}$ (1.5 V). If the level of the error signal is 1.5 volts, indicating that the blue beam current measured by the error detector is equal to the current standard supplied thereto, the bias memory will leave unchanged the stored bias control level. This level is stored in the form of a voltage on a capacitor C50, which establishes the magnitude of the bias control current $I_{55}$ shunted away from the bias adjustment input of the blue video amplifier 6B by the blue bias memory 15B. If the level of the error signal is not equal to $E_{51}$, indicating that the blue beam current is not equal to the current standard, the bias memory will change the magnitude of the bias control level and thereby adjust the bias of the blue amplifier to effect correction of the blue beam current toward its predefined low magnitude.

The bias memory will now be described in detail. It includes a current mirror 50, a differential amplifier comprising transistors Q51 and Q52, a transistor Q53, and an adjustable current sink comprising the capacitor C50, a buffer amplifier A50 and a transistor Q55. The current mirror, differential amplifier and transistor Q53 function in the same manner as the corresponding elements in the error detector 13B. The buffer amplifier applies the voltage to which the capacitor has been charged to the base of transistor Q55 establishing in the collector of transistor Q55 the current $I_{55}$ drawn from the bias adjustment input of the blue video amplifier 6B.

The blue beam current error signal applied to terminal T53 causes a current $I_{52}$ to flow in transistor Q52 whenever a bias strobe signal (FIG. 2I) is applied to the base of Q53, through a terminal T52, indicating that the second portion of a bias test period is occurring. If the blue beam error signal voltage is equal to $E_{51}$, equilibrium exists in the bias memory, with the current $I_{52}$ being equal to the current $I_{51}$ established in Q51 by $E_{51}$, and no net current flow into or out of the capacitor C50. Thus the current $I_{55}$ remains unchanged. If the blue beam error signal voltage is not equal to $E_{51}$, however, the voltage on capacitor C50 will be changed by the circuitry to adjust $I_{55}$.

For example, if the error signal voltage is larger than $E_{51}$, indicating that the blue beam current is larger than its predefined low magnitude, the current $I_{52}$ will be greater than $I_{51}$. The magnitude of a current $I'_{51}$ produced at the output of the current mirror 50 is a duplicate of the current $I_{51}$. Because current $I'_{51}$ is less than $I_{52}$, the capacitor C50 partially discharges into transistor Q52 to make up the current deficit, causing a decrease in the voltage on capacitor C50 and a consequent decrease in the current $I_{55}$. This decrease in $I_{55}$ causes the blue video amplifier output voltage to increase, thereby effecting a reduction in the magnitude of the blue beam current. Conversely, if the error signal voltage is smaller than $E_{51}$, indicating that the blue beam current is smaller than its predefined low magnitude, the current $I_{52}$ will be smaller than $I_{51}$, and current of the magnitude $I'_{51}-I_{52}$ will charge capacitor C50. The voltage on C50 will increase causing an increase in $I_{55}$, a decrease in the amplifier output voltage and an increase in the magnitude of the blue beam current.

Figure 6:
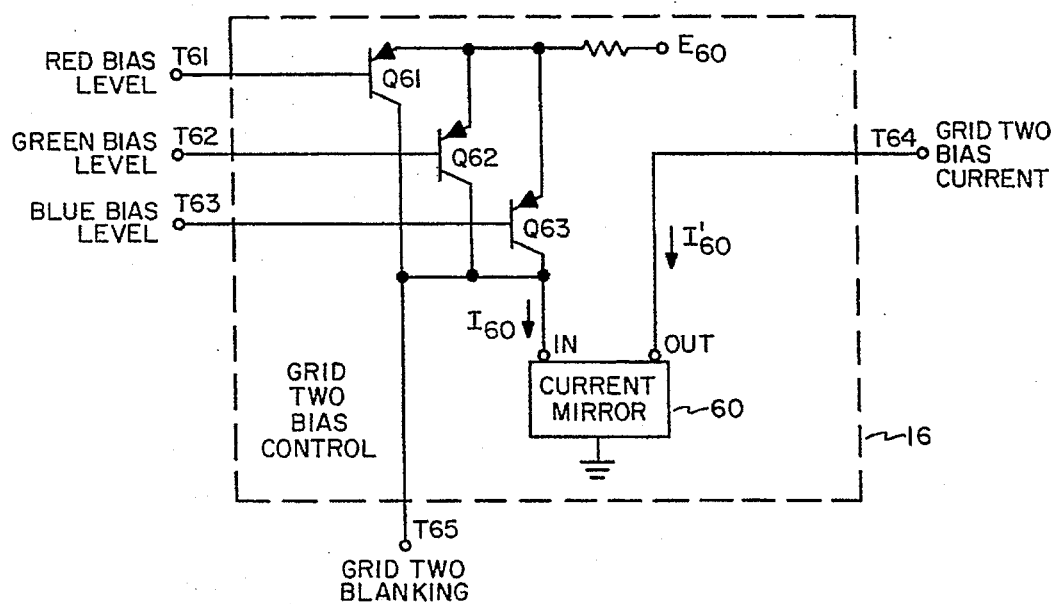
FIG. 6 is a schematic illustration of a grid two bias control associated with both embodiments.

A blue bias level terminal T54 is provided to enable utilization of the grid two bias control 16. This terminal, which is connected to the base of transistor Q55, provides a blue bias level voltage $V_{55}$ which is a measure of the current flowing through a resistor in the emitter circuit of Q55, to a reference voltage $V_T$. This current is substantially equal to the current $I_{55}$. The voltage $V_{55}$ is also an indicator of the video amplifier output voltage because as the current $I_{55}$ decreases toward zero the DC level of the video amplifier output voltage approaches its upper limit. The blue bias level terminal T54 (and corresponding terminals on bias memories 15R, 15G) are connected to the grid two bias control 16 which is illustrated in detail in FIG. 6.

The grid two bias control comprises a current mirror 60 and three transistors Q61, Q62, Q63. The bases of these transistors are connected to terminals T61, T62, T63, respectively at which the red, green, blue bias level signals are received from the red, green, blue bias memories. (Only one bias level input terminal and one transistor is required if the grid two bias control is to be utilized with a single beam CRT). The emmitter of each transistor is connected to a reference voltage $E_{60}$ which is of sufficient magnitude to forward bias the transistor if the bias level signal applied thereto decreases to a voltage near $V_T$. This occurs only if the current $I_{55}$ approaches zero, indicating that the output voltage of the respective video amplifier has increased to a predetermined voltage near its upper limit. The voltage $V_T$ is chosen to fall within the middle of the range of operating voltages for C50.

A current of magnitude $I_{60}$ produced by the forward biased transistor is duplicated by the current mirror 60 and provided as an output current $I'_{60}$, designated the grid two bias current, at a terminal T64. This terminal is connected to the emitter of transistor Q1 shown in FIG. 1. The grid two bias current drawn from the emitter of transistor Q1 produces a bias control potential in the form of a decrease in the grid two voltage of the CRT, reducing beam current to the desired magnitude. In effect, the grid two bias control extends the beam current control range beyond that provided by the video amplifiers.

Beam blanking is also effected by the grid two bias control, as previously mentioned, when the grid two blanking signal (FIG. 2C) is applied thereto by the timing generator. This signal is applied in the form of a current which flows into the current mirror 60 as the current $I_{60}$ which is duplicated at terminal T64 as the grid two bias current $I'_{60}$. The grid two bias current drawn from the emitter of Q1 in response to the grid two blanking signal is of sufficient magnitude to blank the electron beams in the CRT.

Gain Control

Figure 7:
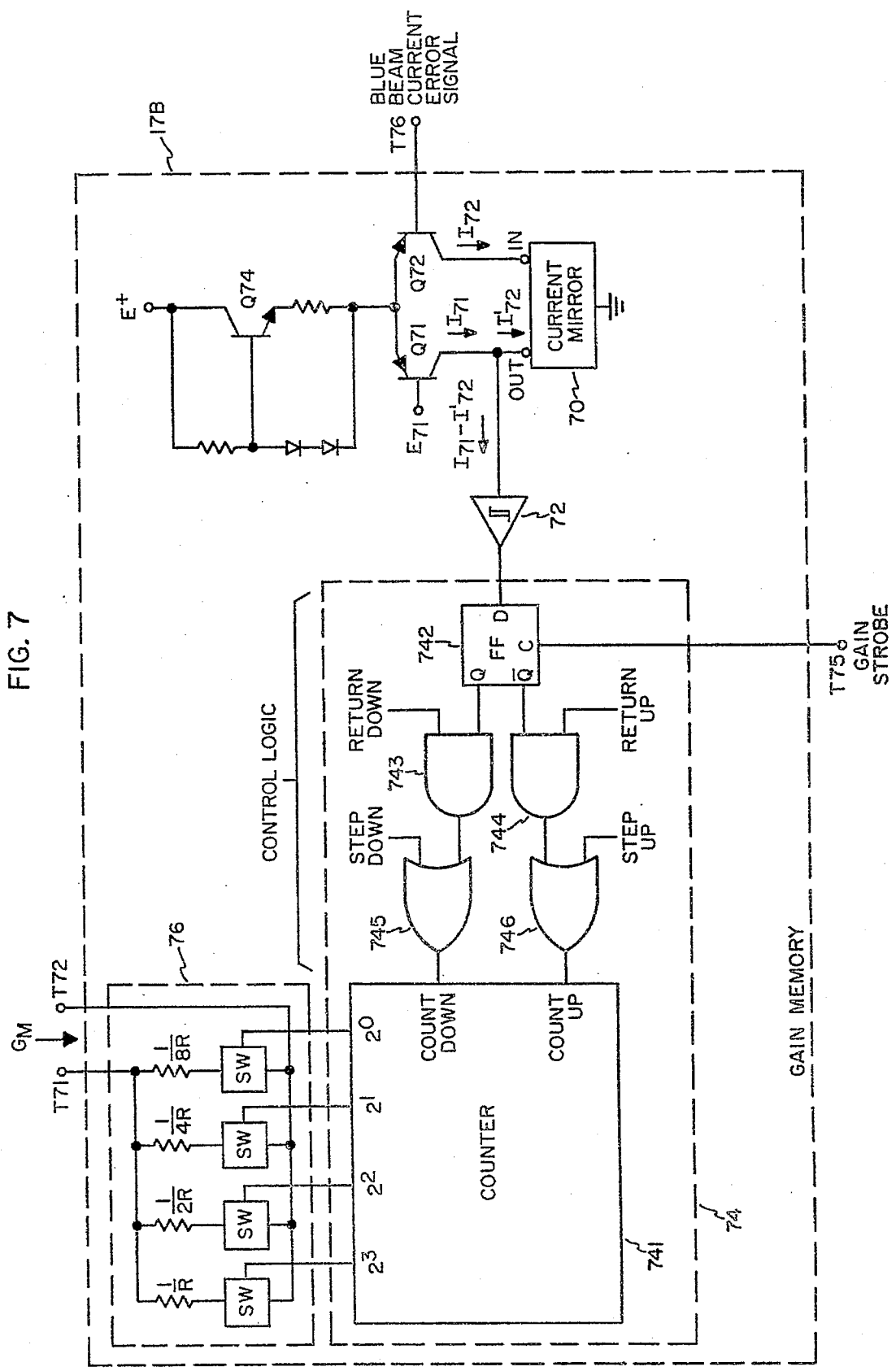
FIG. 7 is a schematic illustration of a gain memory associated with each controlled video amplifier in both embodiments.

The gain memory 17B, utilized with the blue channel, is illustrated in one form thereof in FIG. 7. The gain memories 17R, 17G utilized with the red and green channels are identical thereto and operate, in their respective channels, in the same manner as will be described for the blue gain memory 17B. During the second part of each test period, the blue gain memory receives at a terminal T76 the blue beam current error signal produced by the blue beam current error detector 13B. If the test period is a gain test period the voltage level of the error signal is compared with a reference voltage $E_{71}$ (1.5 V) and the stored gain control level is adjusted as will be described. This level is stored as a value in a digital counter 741, which establishes the magnitude of the conductance in shunt with the emitter resistance in the blue video amplifier.

The variable conductance 76 utilized to adjust the gain of the video amplifier comprises four parallel connected conductances, of magnitudes 1/R, ½R, ¼R and ⅛R, each in series with a controlled electronic switch. The state of each switch is controlled by one of four respective stages of the four-stage binary counter 741. For each of the sixteen possible counter states (0-15) the effective conductance between terminals T71 and T72 is the parallel combination of the conductances in series with closed switches. By weighting each of the four conductances such that its magnitude is equal to the value $2^n/8R$, were n=the rank (0, 1, 2, 3) of the counter state controlling the switch in series with the conductance, a set of sixteen unique conductances are obtained. The effective conductance $G_m$ for each counter state can be determined from the equation:

$$G_m = m/8R$$

where m is the counter state (0-15). By providing this relationship between the counter state and the effective conductance connected across terminals T71 and T72, the gain of the video amplifier 6B can be correlated with the counter state. This relationship follows because the gain of the video amplifier is proportional to the conductance of the amplifier's emitter circuit, to which terminals T71 and T72 are connected.

The gain memory includes a current mirror 70, a differential amplifier comprising transistors Q71 and Q72, a transistor Q74 connected as a constant current source, a Schmitt trigger 72, logic circuitry 74, and the variable conductance 76. The current mirror and differential amplifier function in the same manner as the corresponding elements in the bias memory. The Schmitt trigger is a bistable device which senses the current at its input and produces either a logical ONE or logical ZERO output signal, depending on the magnitude and direction of its input current. A gain strobe signal (FIG. 2L) is applied by the timing generator to a terminal T75 during the second portion of each gain test period enabling the logic circuitry 75 to monitor the output of the Schmitt trigger.

The blue beam error signal applied to terminal T76 causes a current $I_{72}$ to flow in transistor Q72. If the blue beam error signal voltage is larger than $E_{71}$, indicating that the blue beam current is larger than its predefined intermediate magnitude, the current $I_{72}$ will be larger than $I_{71}$. The magnitude of the current $I'_{72}$ produced at the output of the current mirror 70 is a duplicate of the current $I_{72}$. Because current $I_{71}$ is less than $I'_{72}$, the Schmitt trigger 72 supplies current to the output of the current mirror. If the current that must be supplied thereby to make up the difference between $I_{71}$ and $I'_{72}$ is larger than a preselected threshold current, indicating that the blue beam current is significantly larger than its predefined intermediate magnitude, the Schmitt trigger will produce a logical ONE output. This output will be used to reduce the drive of the blue amplifier. Conversely, if the blue error signal voltage is less than $E_{71}$, the current $I_{72}$ will be smaller than $I_{71}$ and the Schmitt trigger will draw current from the output of the current mirror. If this current is larger than a preselected threshold current, indicating that the blue beam current is significantly smaller than its predefined intermediate magnitude, the Schmitt trigger will produce a logical ZERO output. This output will be used to increase the drive of the blue amplifier. Finally, if the blue beam error signal voltage is close to $E_{71}$ such that the current difference $I_{71}-I'_{72}$ falls between the two current thresholds, the output of the Schmitt trigger will remain in its previously established state. The reason for this hysteresis, or difference between the positive and negative currents which cause the Schmitt trigger to change its output state, is to decrease the sensitivity of the Schmitt trigger to small variations in its input current caused by noise.

The counter state is incremented and decremented, to adjust the gain of the video amplifier, by control logic including a flip flop 742, two AND-gates 743, 744 and two OR-gates 745, 746. The control logic responds to the output signals produced by the Schmitt trigger 72 and to the timing signals illustrated in FIGS. 2L-2P to cause the counter to either increment or decrement to the state which produces the appropriate amplifier gain. This is accomplished by causing the counter to alternately increment and decrement by a single count at the beginning of each successive gain test period to effect a gain change. After each gain change the control logic monitors the output of the Schmitt trigger to determine whether the change has caused the difference between the nominal predefined beam current and the actual beam current to change sign. If so, the counter state is returned to the gain existing before the change. By returning the counter to its initial state, the gain of the video amplifier, which is adjusted in discrete steps by the logic circuitry 74, is prevented from cycling between magnitudes just above and below the exactly correct magnitude in alternate gain test periods. This cycling would cause an objectionable flicker of the image presented by the CRT.

Figure 2:
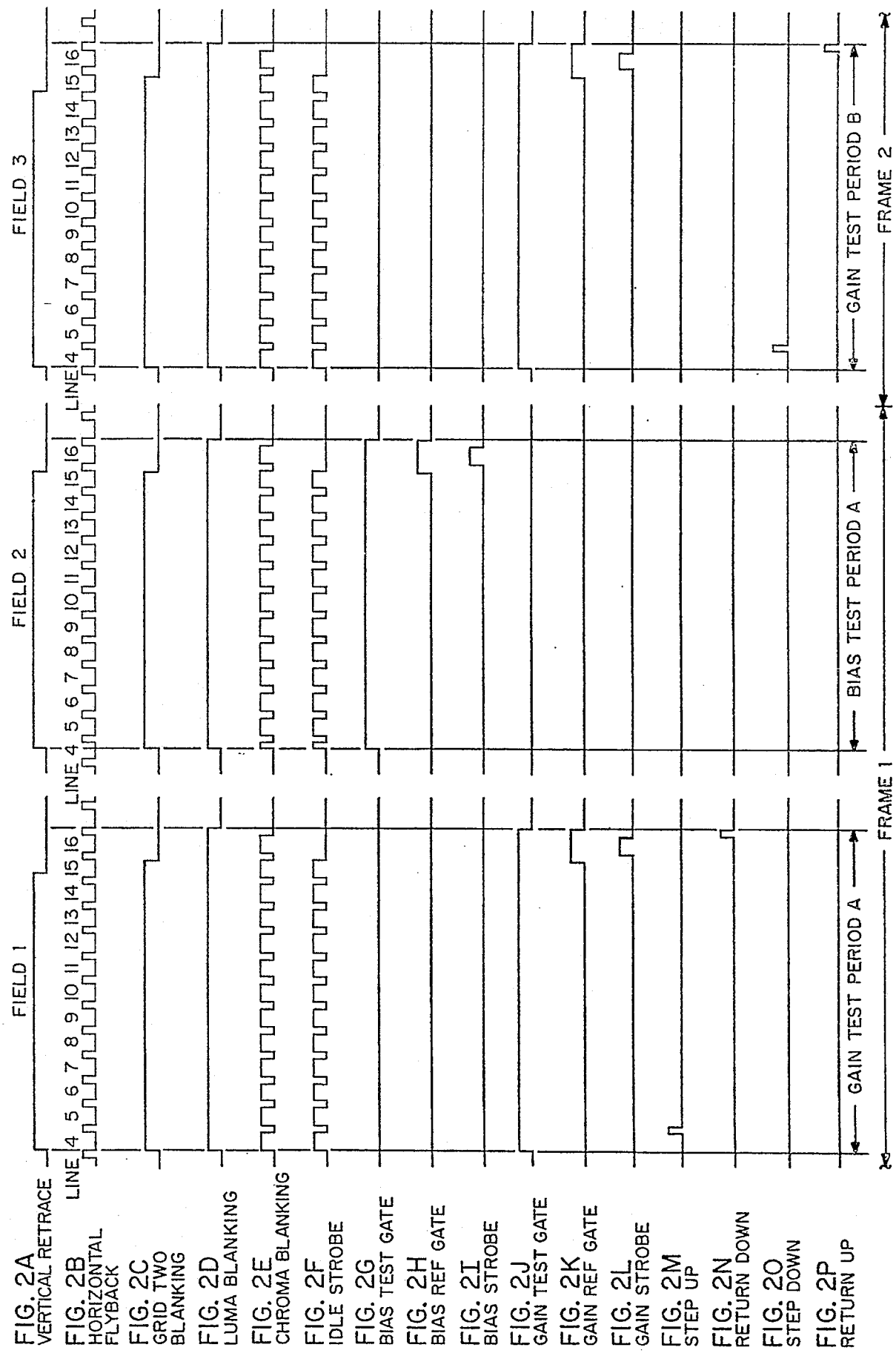
FIGS. 2A through 2P illustrate timing waveforms applicable to the first and second embodiments.

The first gain test period shown in FIG. 2 (gain test period A) illustrates the operation of the gain control circuit when the counter is incremented to effect a gain change. Just after the period begins, a step up signal (FIG. 2M) is applied through OR-gate 746 to a count up input of the counter. This signal causes the counter to increment to the next higher state effecting a slight increase in the gain of the video amplifier. The error in the beam current (high, low) produced at this gain causes the Schmitt trigger to assume one of its two states. The state of the Schmitt trigger is sensed by the flip-flop during the gain strobe signal, and immediately following this signal a return down signal (FIG. 2N) is applied to the gate 743. If the output signal produced by the Schmitt trigger is a logical ONE, indicating that the actual beam current is higher than the predefined intermediate magnitude which is ideally produced during the gain test period, the flip-flop will be set upon termination of the gain strobe and the resulting logical ONE produced at its Q output will enable the return down signal to pass through AND-gate 743. This signal will also pass through OR-gate 745 to a count down input of counter 741, causing the counter to be decremented to the state existing immediately before the gain test period. Conversely, if the output signal produced by the Schmitt trigger is a logical ZERO, indicating that the measured beam current is lower than the predefined magnitude, the flip-flop will be reset upon termination of the gain strobe and the resulting logical ZERO produced at its Q output will prevent the return down signal from passing through gate 743. Thus, the counter will not be decremented and the upwardly adjusted gain, which did not cause the beam current to exceed the predefined magnitude, will be maintained.

The second gain test period shown in FIG. 2 (gain test period B), which alternates with gain test period A, illustrates the operation of the gain control circuit when the counter is decremented to effect a gain change. Operation is similar to that described above for test period A, but the counter is first decremented by a step down signal (FIG. 2O) applied to the count down input of the counter through gate 745. Near the end of the test period the counter is incremented to its original state by a return up signal (FIG. 2P) if the flip-flop is reset by a logical ZERO output from the Schmitt trigger, indicating that the measured beam current is lower than the predefined magnitude. Conversely, if the beam current is too high, the flip-flop will be set by a logical ONE output from the Schmitt trigger disabling gate 744, preventing the return up signal from passing therethrough to the counter, and leaving the counter in the decremented state.

Second Embodiment

Figure 8:
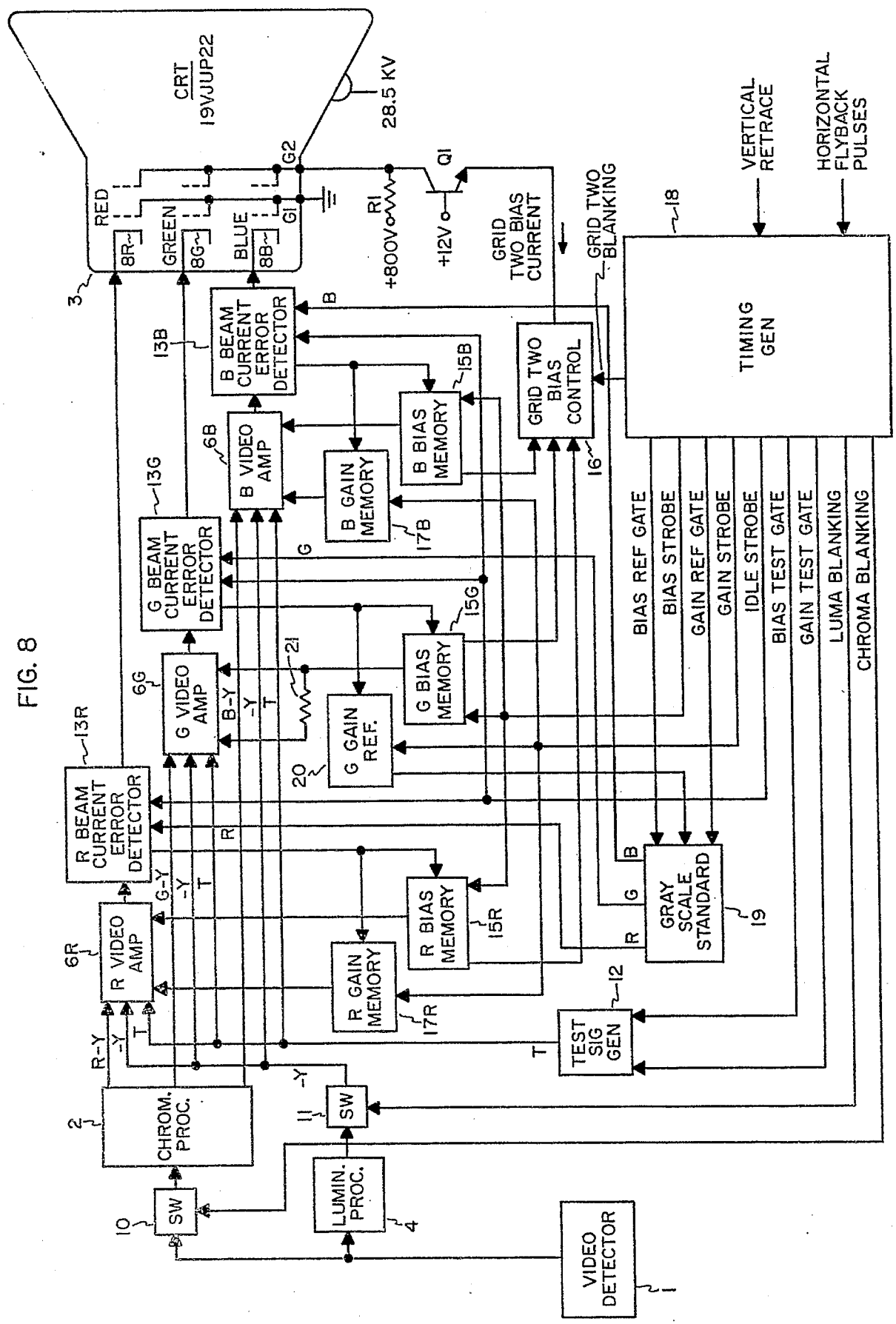
FIG. 8 is a block diagram of a second embodiment of the automatic gray scale tracking system in which the gain of the video amplifier in one channel is not controlled, but is held fixed.

A second embodiment of the invention, which is for the most part identical to the first embodiment, is illustrated in FIG. 8. In the figure, parts which are identical to those used in the first embodiment are identified with like indicia. These include the video detector 1, the chrominance processor 2, the CRT 3, the luminance processor 4, the video amplifiers 6R, 6G, 6B, the switches 10, 11, the test signal generator 12, the beam current error detectors 13R, 13G, 13B, the bias memories 15R, 15G, 15B, the grid two bias memories 15R, 15G, 15B, the grid two bias control 16, the red and blue gain memories 17R, 17B, the timing generator 18, and the gray scale standard 19.

In the second embodiment, as in the first embodiment, the biases of the three video amplifiers are adjusted during bias test periods to correct the beam currents toward predefined, low magnitudes. The beam currents produced during the gain test periods are not corrected toward "predefined" magnitudes, however, because the circuitry has been simplified by replacing one of the three gain memories with a fixed conductance 21, and thus the gain of the associated video amplifier is not automatically adjustable. (In FIG. 8 the green video amplifier has arbitrarily been selected for this modification.) The beam current established by the green video amplifier, during each gain test period, is utilized by the error detector 13G and a green gain reference 20 to produce the gain reference voltage which establishes the intermediate magnitude current standards supplied to the three error detectors 13R, 13G, 13B by the gray scale standard 19. The gain reference voltages thus produced gradually varies as the electrical characteristics of the fixed gain amplifier and the transconductance of the CRT change with temperature and age. Nevertheless, gray scale tracking is maintained because the ratios of the three-current standards produced by the gray scale standard 19 are fixed by the emitter resistors in the gray scale standard (FIG. 4) and thus the ratios of these standards are independent of these variations. As previously discussed, only these ratios need be maintained for proper gray scale.

Figure 9:
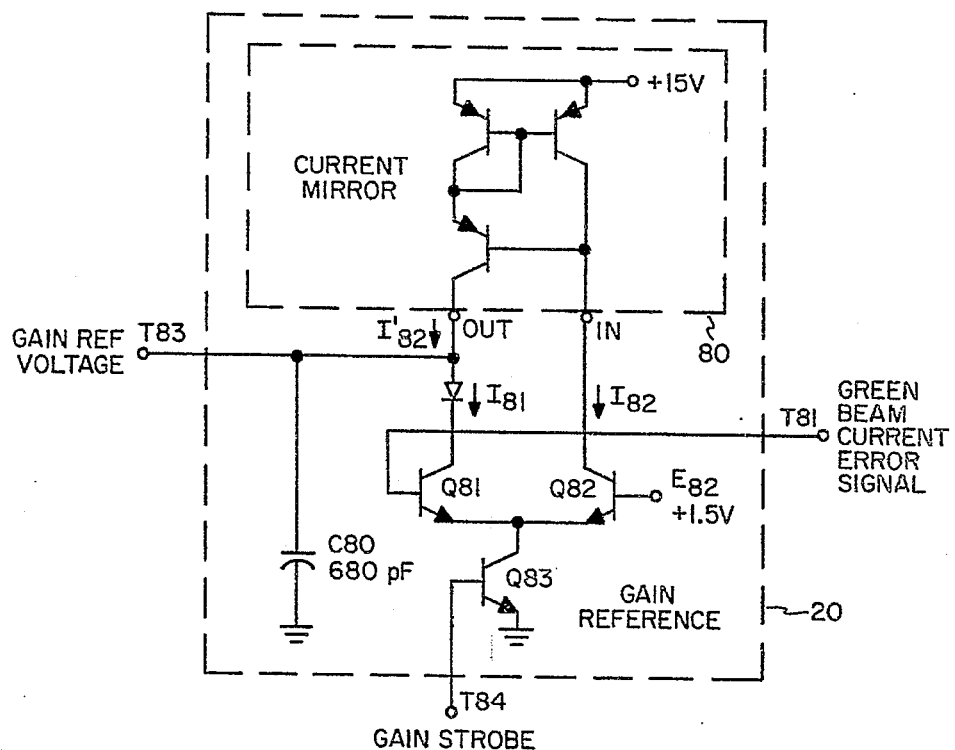
FIG. 9 is a schematic illustration of the green gain reference associated with the second embodiment.
Figure 11:
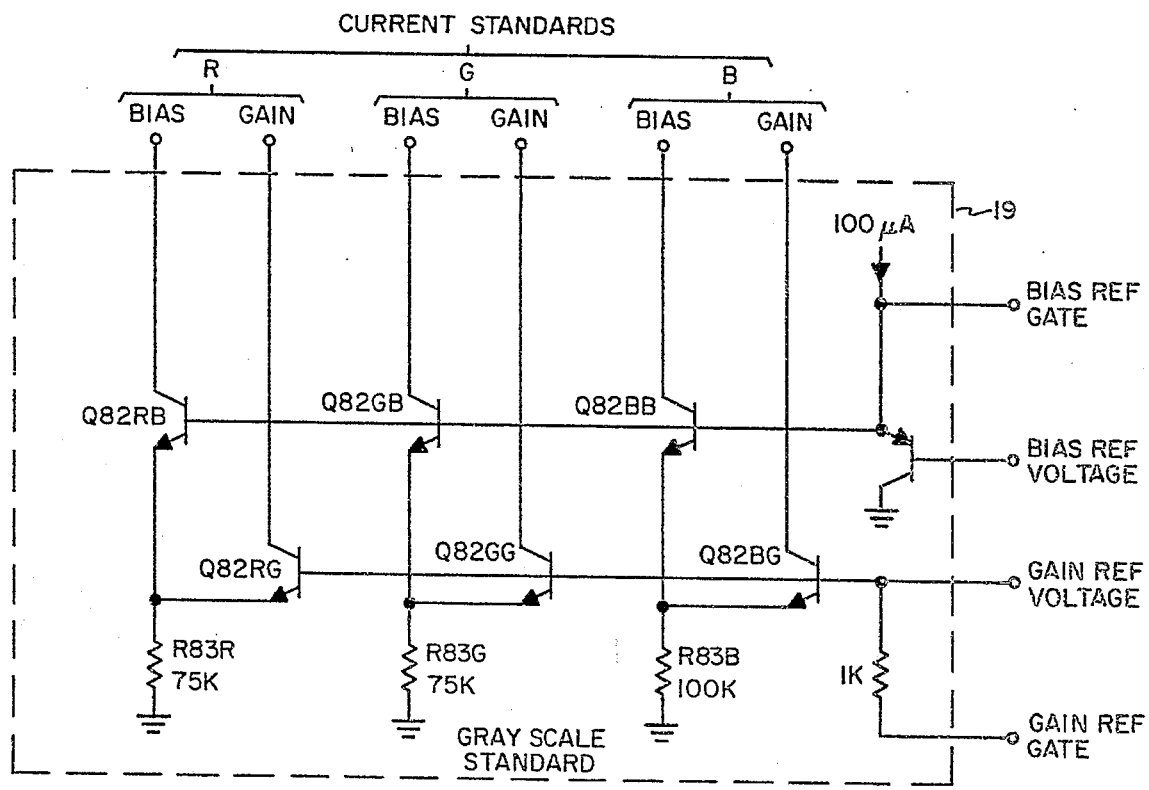
FIG. 11 is a detailed schematic illustration of the gray scale standard for producing the current standards in each embodiment.
Figure 10:
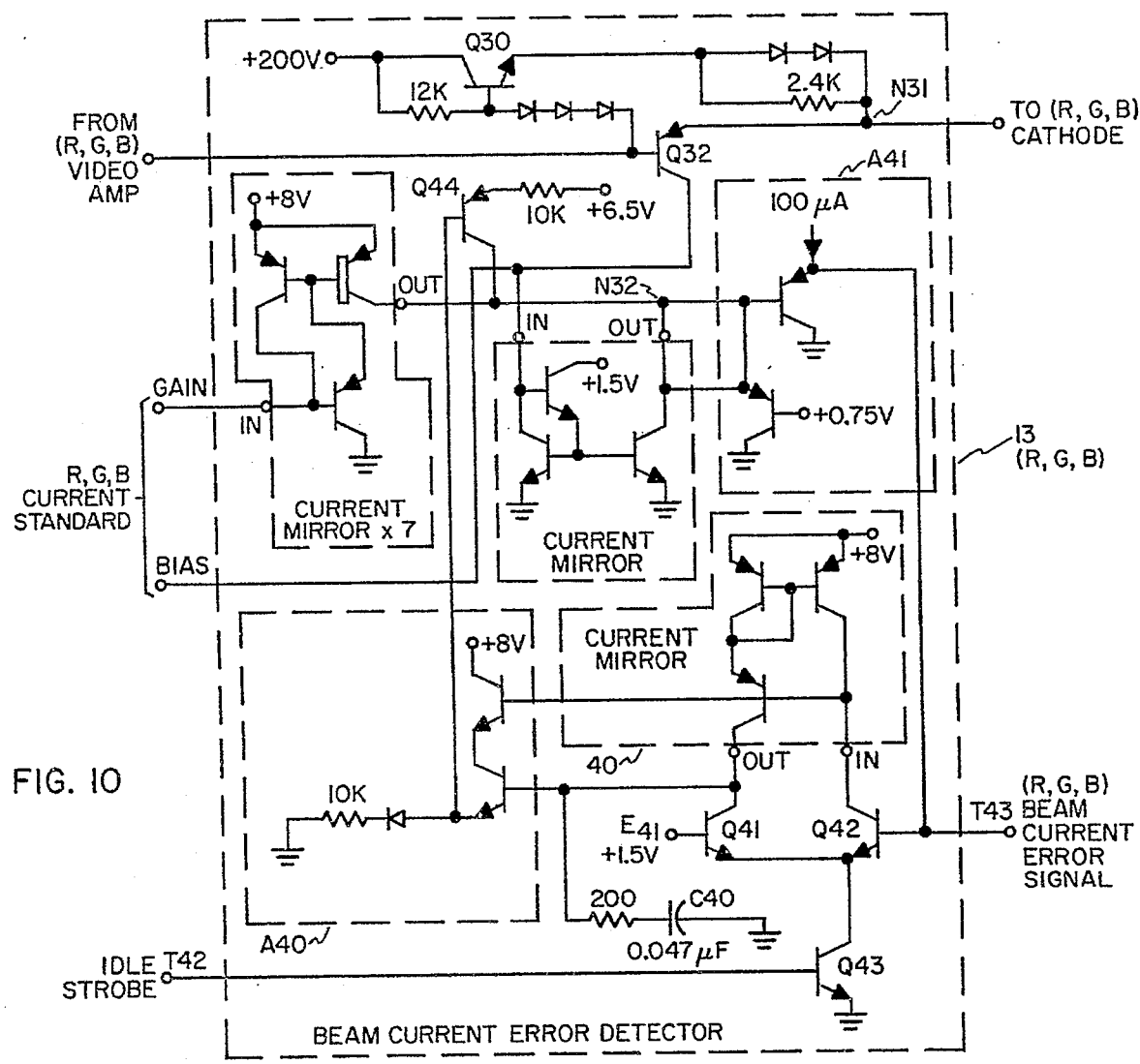
FIG. 10 is a detailed schematic illustration of a beam current error detector associated with each channel of both embodiments.
Figure 13:
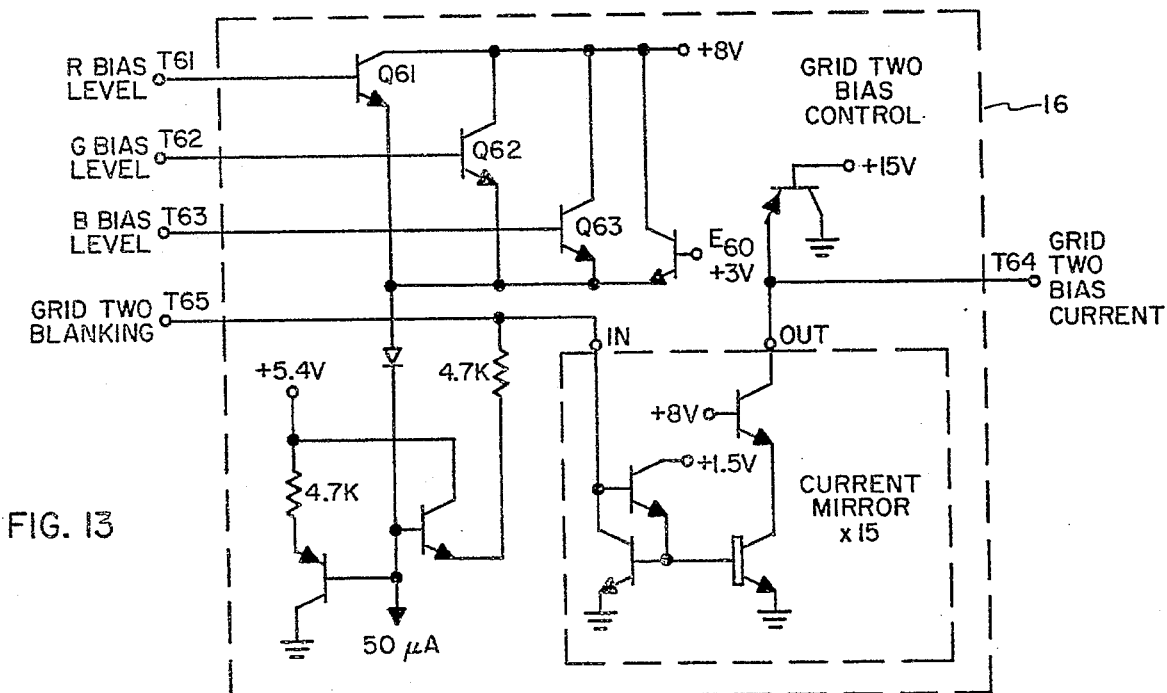
FIG. 13 is a detailed schematic illustration of the grid two bias control associated with both embodiments.
Figure 12:
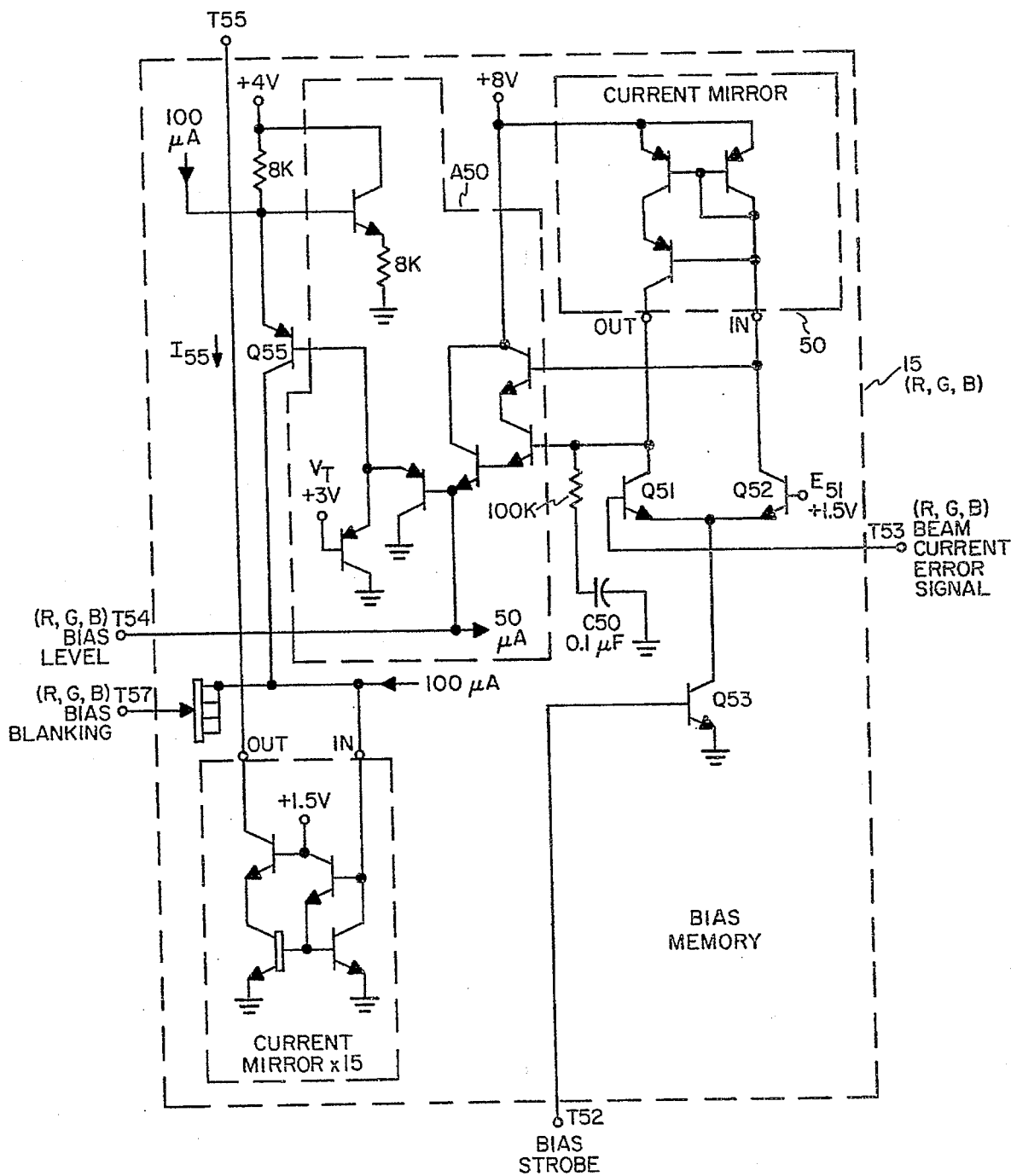
FIG. 12 is a detailed schematic illustration of the bias memory associated with each video amplifier in both embodiments.
Figure 14:
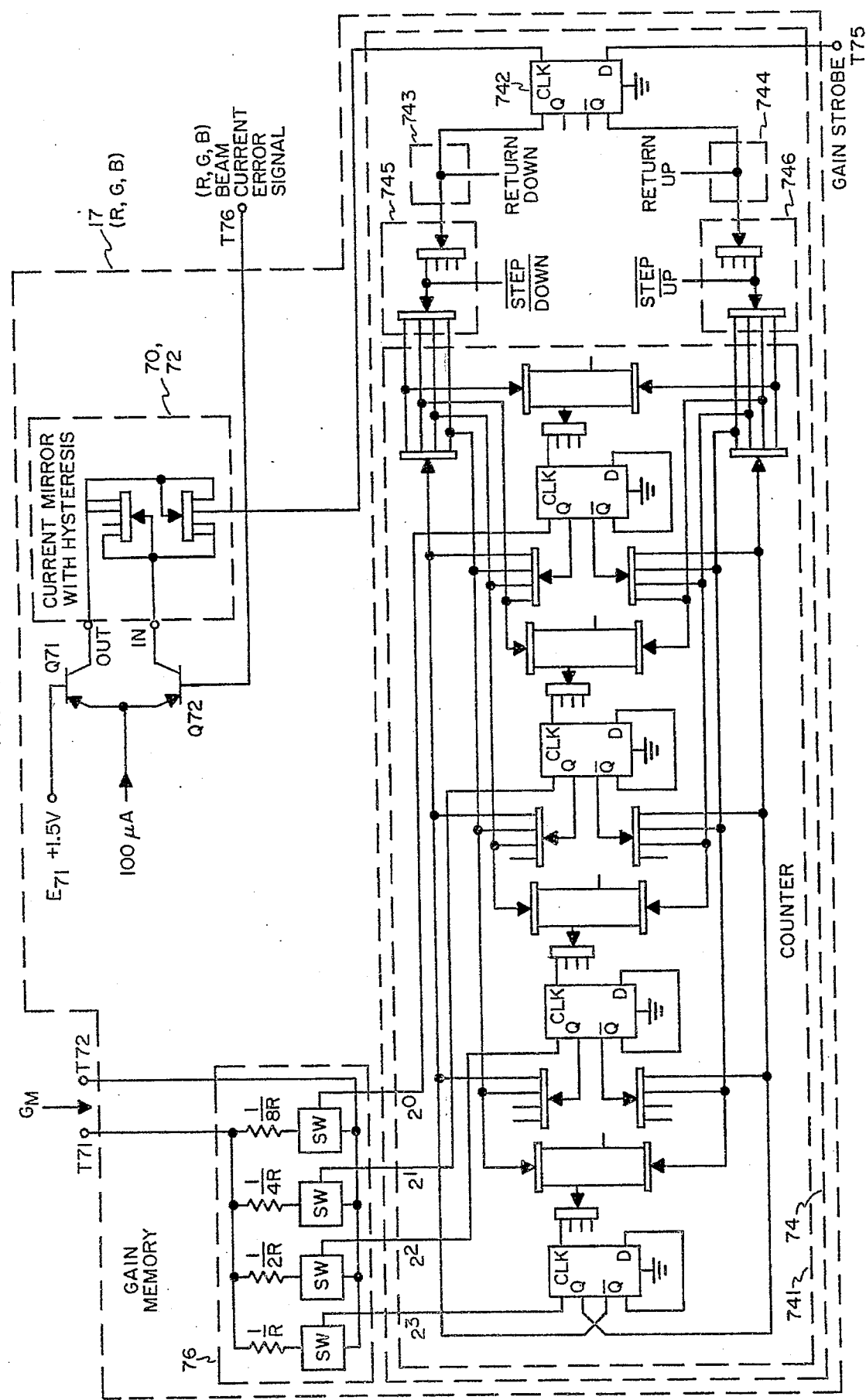
FIG. 14 is a detailed schematic illustration of the gain memory associated with each controlled video amplifier in both embodiments.

The gain reference 20 is illustrated in one form thereof in FIG. 9. It includes a current mirror 80, a differential amplifier comprising transistors Q81 and Q82, a transistor Q83, and a capacitor C80.

The capacitor C80 stores the gain reference voltage utilized by the gray scale standard 19 to produce the intermediate magnitude current standards supplied to the error detectors 13R, 13G, 13B. The current mirror 80 and differential amplifier Q81, Q82 function to charge C80 to a voltage level which causes production by the gray scale standard of an intermediate magnitude green current standard which is equal to the green beam current measured by the green beam current error detector 13G during each gain test period. If these two currents are equal, the green beam error signal voltage, which is applied to the base of transistor Q81 through a terminal T81 of the gain reference, will be equal to a 1.5 volt level ($E_{82}$) applied to the base of transistor Q82. This causes the currents drawn from the current mirror by Q81, Q82 to be equal and the gain reference voltage stored on the capacitor remains stable. If the error signal voltage differs from $E_{82}$, however, indicating that the green beam current is not equal to the green current standard, the capacitor will be either charged or discharged to change the gain reference voltage level, and thus the green standard current, so as to restore equality to the currents. The manner in which the differential amplifier and current mirror function to cause this change in capacitor voltage is similar to that previously described for the bias memories 15R, 15G, 15B.

Much of the illustrative circuitry disclosed in the description of the first and second embodiments has been shown in simplified form. For the sake of completeness, more detailed illustrations of circuitry which may be used to implement the disclosed embodiments are provided in FIGS. 9-15. The detailed circuitry will now be compared to the simplified illustrations thereof and the significant differences will be discussed.

FIGS. 10-14 are detailed illustrations of circuitry used to implement the error detectors 13R, 13G, 13B; the gray scale standard 19; the bias memories 15R, 15G, 15B; the grid two bias control 16; and the gain memories 17R, 17G, 17B, respectively. The circuits portrayed in these detailed illustrations closely resemble their counterparts, previously described, and direct comparison can be made without further explanation. Like terminals and parts in the simplified and the detailed circuits have been identified with like indicia.

Figure 15:
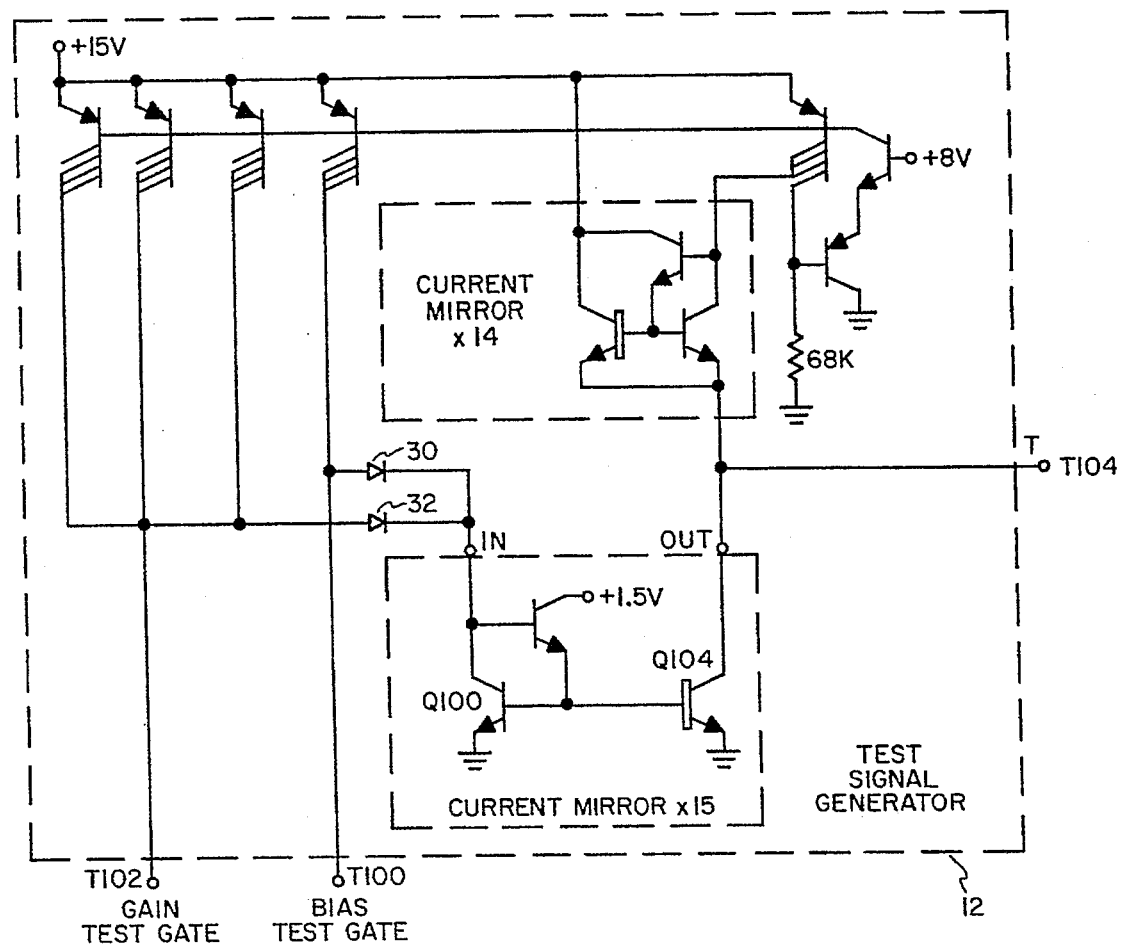
FIG. 15 is a detailed schematic illustration of a test signal generator associated with each embodiment.

FIG. 15 illustrates the test signal generator 12, previously described with reference to FIG. 3. It comprises a plurality of multiple-collector transistors, each biased to produce constant collector currents, an amplifying current mirror with a gain of 15, and diode switches 30, 32 implementing the correspondingly numbered switches shown in FIG. 3. Each collector produces a constant current of approximately 100 μa. The current mirror multiplies current entering its input and flowing principally through a transistor Q100, by providing the same base drive to an output transistor Q104 as it provides to Q100. Because Q104 has an emitter area which is 15x that of Q100 the gain of 15 is produced. The greater area of transistor Q104 is symbolized by the distinctive symbol used to represent this transistor.

Upon application of the bias test gate signal to a terminal T100, diode switch 30 is foward biased and a current of approximately 300 μa, collectively produced by three of the transistor collectors, flows through switch 30 and into the input of the current mirror. This current is amplified by the current mirror to a current of 4.5 ma flowing into the output thereof from an output terminal T104 which is connected to the luminance inputs of the video amplifiers, 6R, 6G, 6B. Upon application of the gain test gate signal to a terminal T102 diode switch 32 is forward biased and a current of approximately 900 μa, collectively produced by nine of the transistor collectors, flows through switch 32 and into the input of the current mirror, where it is amplified to a current of 13.5 ma flowing from terminal T104.

Figure 16:
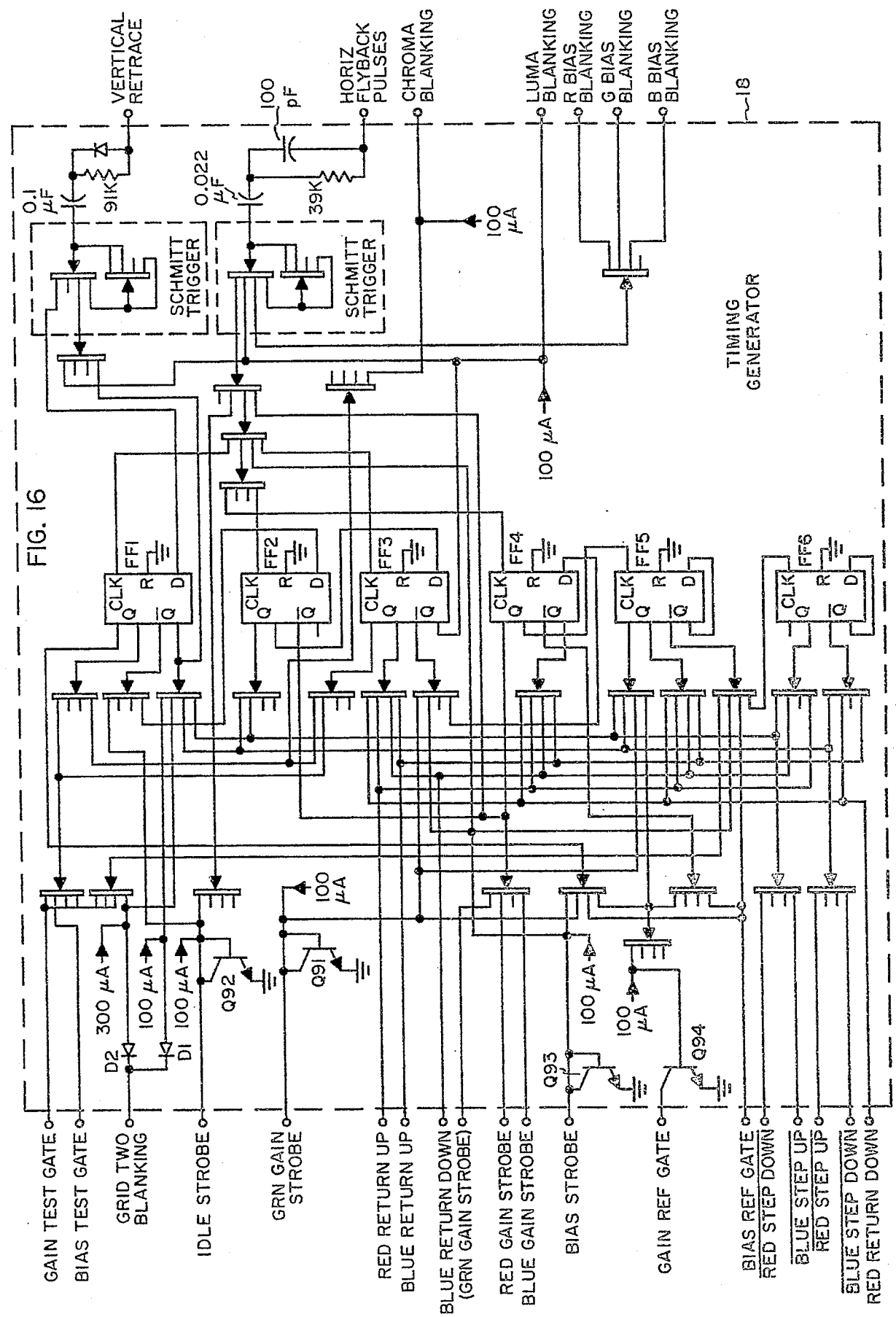
FIG. 16 is a detailed schematic illustration of a timing generator associated with each embodiment.

FIG. 16 illustrates the timing generator 18 previously described with reference to the block diagram of FIG. 1 and the timing diagram of FIGS. 2A-2P. The timing generator includes input terminals for receiving the vertical retrace signal and the horizontal flyback pulses illustrated in FIGS. 2A, 2B, Schmitt triggers for "cleaning up" the waveshapes of the vertical retrace signal and the horizontal flyback pulses, a plurality of interconnected flip-flops and IIL (Integrated Injection Logic) inverters for processing the outputs produced by the Schmitt triggers to form the signals illustrated in FIGS. 2C-2P, and a plurality of output terminals at which these signals are provided.

Note that two output terminals are provided for the green gain strobe. One of these strobe signals (listed in parenthesis) is provided for use in the first embodiment where the green gain strobe is applied to the gain memory 17G, and the other strobe signal is provided for use in the second embodiment where the green gain strobe is applied to the gain reference 20. The primary difference between the circuitry providing these two strobe signals is the inclusion of a bipolar transistor Q91, forming half of a current mirror, in the circuitry providing the strobe signal applied to the gain reference 20. The transistor forming the other half of the current mirror is the transistor Q83 in the gain reference (FIG. 9). Whenever a green gain strobe signal is to be produced, the outputs of all inverters connected to transistor Q91 open, causing the 100 μa current normally shunted to ground by the inverters to pass through Q91. This current is duplicated by Q83, thus establishing the rate at which the gain reference voltage on capacitor C80 (FIG. 9) changes to compensate for changes in the green beam current.

Additional circuitry to also provided between several other output terminals and the inverters in the timing generator. The idle strobe and bias strobe output terminals are shunted by bipolar transistors Q92 and Q93 which form halves of current mirrors including transistor Q43 (FIGS. 3, 10) and Q53 (FIGS. 5, 12) in each beam current error detector and in each bias memory, respectively. These current mirrors function similarly to the one just described.

The gain reference gate output terminal is connected to an inverter through bipolar transistor Q94. This transistor has been added to the timing generator to provide sufficient voltage handling ability to drive the transistors Q82RG, Q82GG, Q82BG (FIG. 11) in the gray scale standard.

The terminal providing the grid two blanking signal is connected to the inverters in the timing generator through two diodes D1, D2 each providing a different current to the terminal when it is forward biased. During the first portion of each bias test period, diode D1 is forward biased by the inverter circuitry and a current of 100 μa flows out of the terminal to the grid two bias control (FIGS. 6, 13) as the grid two blanking signal. During the first portion of each gain test period, both diodes D1 and D2 are forward biased by the inverter circuitry and a total current of 400 μa flows out of the terminal to the grid two bias control. In this control, the grid two blanking signal received is amplified by a factor of 15 to supply the grid two bias current needed to blank the electron beams. During bias test periods the 100 μa signal is amplified by a current mirror in the bias control to a bias current of 1.5 ma, and during gain test periods the 400 μa signal is amplified by the mirror to a bias current of 6.0 ma. This current has a greater magnitude during gain test periods than during bias test periods because the gain test signal causes a larger beam current than the bias test signal and a greater decrease in the grid two voltage is required to blank the beam.

Thus embodiments of the invention have been disclosed for preserving predetermined relationships between applied video signals and images presented by color cathode ray display devices. Although specific embodiments have been disclosed, it is to be understood that they are only illustrative and the scope of the invention is to be determined from the claims. For example, the circuitry utilized for producing the error signals could be implemented in digital form rather than the described analog form. As another example, the circuitry could be utilized with a cathode ray display device having a plurality of single beam CRTs producing monochromatic images which are optically combined to form a polychromatic image. As yet another example, the video amplifiers could be used to drive control grids of the beam producing guns, rather than the cathodes. In this case the beam current error detectors coupled to the cathodes would serve to provide a fixed bias for the cathodes and to determine the beam currents as previously described.

I claim:

1. Apparatus for achieving and maintaining gray scale tracking in a multibeam cathode ray color display device despite fluctuations in the electrical characteristics of said display device and the video amplifiers driving said device, comprising:

A. a source of detected video signals;
B. a test signal generator for providing bias test signals which, after prescribed amplification, produce beam currents corresponding to a standard gray video image of low intensity; and gain test signals which, after prescribed amplification, produce beam currents corresponding to a standard gray video image of intermediate intensity;
C. a plurality of video amplifiers, each including:
 1. bias adjusting means responsive to a bias control quantity, and
 2. gain adjusting means responsive to a gain control quantity,
D. switching means for coupling said video signals or said test signals to the inputs of said video amplifiers, said bias and gain test signals being coupled during predetermined bias and gain test periods, respectively;
E. a multibeam cathode ray color display device including:
 1. a plurality of electron beam producing guns, each including a cathode, and
 2. a beam blanking grid,
  each gun being driven from the output of a corresponding video amplifier;
F. means for applying blanking potentials to said beam blanking grid during a portion of each test period;
G. a standard for producing current standards corresponding to the prescribed beam currents required for a gray image of low intensity during bias test periods, and for a gray image of intermediate intensity during gain test periods;
H. beam current error detection means, coupled to each cathode, comprising:
 1. means for obtaining two samples of the cathode current, taken during each of said test periods when a given test signal is applied to said video amplifier, one sample being taken when the beam is blanked and the other sample being taken when the beam is not blanked, the difference in said samples representing the beam current;
 2. means for storing the earlier cathode current sample for each test signal; and
 3. summation means for combining the later cathode current sample, the stored earlier cathode current sample, and the current standard for each test signal, in a sense to obtain an error signal indicating the difference between the beam current and said current standard during the bias test period and during the gain test period;
I. a plurality of control memories, each coupled to a respective video amplifier, each control memory including:
 1. bias memory means, coupled to said bias adjusting means of the respective video amplifier, for storing a bias control quantity, adjustable in response to said detected error signal obtained during said bias test period, for correction of said beam current toward said standard; and
 2. gain memory means coupled to said gain adjusting means of each video amplifier for storing a gain control quantity, adjustable in response to said detected error signal obtained during said gain test period, for correction of said beam current toward said standard; and
J. means for timing the recited operation to allow gain error and bias error measurements in test periods selected to permit an uninterrupted image display while achieving continuous correction.

2. Apparatus for achieving and maintaining gray scale tracking in a multibeam cathode ray display device which produces color images represented by detected video signals applied by a source thereof to video amplifiers applying color signals to the device, the gray scale being maintained despite fluctuations in the electrical characteristics of the display device and in the video-amplifiers, said apparatus comprising:

A. the cathode ray display device, including:
 1. a plurality of color guns for receiving respective ones of the color signals, said guns including cathodes for producing electron beam currents, the magnitudes of said currents being controlled by the color signals to effect production of the color images;

2. beam-blanking grid means for blanking the beams produced by the guns when a blanking potential is applied thereto;

B. the video amplifiers, each including:
 1. a bias adjustment input to enable adjustment of the bias thereof;
 2. a gain adjustment input to enable adjustment of the gain thereof;

C. switching means coupling the video signal source and the video amplifiers, said switching means interrupting application of the video signals to the amplifiers during alternately-occurring bias and gain test periods which are timed to avoid interference with the displayed image;

D. a test signal generator coupled to the inputs of the amplifiers for alternately applying a bias test signal and a gain test signal to the amplifiers during successive test periods, said bias test signal nominally effecting the production of a first set of electron beam currents of predefined low magnitudes, and said gain test signal nominally effecting the production of a second set of electron beam currents of predefined intermediate magnitudes;

E. means for producing a set of bias current standards and a set of gain current standards, said bias current standards being produced during each application of the bias test signal to the video amplifiers and corresponding to the predefined low magnitude beam currents, and said gain current standards being produced during each application of the gain test signal to the video amplifiers and corresponding to the predefined intermediate magnitude beam currents;

F. means for applying the beam blanking potential to the beam-blanking grid means during a portion of each test period;

G. a plurality of beam current error detectors, each coupled to a respective one of the color gun cathodes to determine, during each test period, the difference between the beam current produced by the gun and the corresponding current standard being produced, said error detectors each comprising:
 1. means for obtaining samples of first and second cathode currents produced by the respective gun during the test period, the first cathode current being produced when the beam currents are blanked and the second cathode current being produced when the beam currents are not blanked, the difference between said first and second cathode currents being the beam current produced by the gun during the test period;
 2. means for storing the sample of the first cathode current;
 3. summation means for combining the current standard and the samples of the first and second cathode currents and producing an error signal representing the difference between said current standard and said beam current;

H. a plurality of bias memories, each coupled to the bias adjustment input of a respective video amplifier and to the beam current error detector coupled to the cathode driven by the amplifier, each of said bias memories adjusting the bias of its respective amplifier in response to changes in a bias control level stored in the memory, said bias control levels changing in response to the respective error signals produced during successive bias test periods, to effect correction of the beam currents toward their predefined low magnitudes; and I. a plurality of gain memories, each coupled to the gain adjustment input of a respective video amplifier and to the beam current error detector coupled to the cathode driven by the amplifier, each of said gain memories adjusting the gain of its respective amplifier in response to changes in a gain control level stored in the memory, said gain control levels changing in response to the respective error signals produced during successive gain test periods, to effect correction of the beam currents toward their predefined intermediate magnitudes.

3. Apparatus as in claim 2 where said display device is a single cathode-ray-tube.

4. Apparatus as in claim 3 where the color signal produced by each video amplifier is applied to the respective cathode in the display device.

5. Apparatus as in claim 3 where the beam current error detector coupled to each gun's cathode comprises:
A. a node for summing currents;
B. means for supplying said first and second cathode currents to the node;
C. a current sink electrically connected to the node for withdrawing from the node a current of magnitude equal to said first cathode current;
D. means for withdrawing from the node the current standard corresponding to the beam current that should be produced by the respective gun, during the test period; and
E. means for sensings the current summation formed at the node and producing the error signal.

6. Apparatus as in claim 5 where the beam current error detector coupled to each gun's cathode further comprises low impedance means for coupling to the cathode the output of the video amplifier producing the respective color signal.

7. Apparatus as in claim 3 and further including means for extending the beam-current control range beyond that provided by the video amplifiers, comprising:
A. means for sensing the DC levels of the output signals produced by the video amplifiers; and
B. means for applying a beam-current reducing potential to the grid means in the display device when the DC level of the output signal produced by any of the amplifiers reaches its beam-current-reducing limit.

8. Apparatus for achieving and maintaining gray scale tracking in a multibeam cathode ray color display device despite fluctuations in the electrical characteristics of said display device and the video amplifiers driving said device, comprising:
A. a source of detected video signals;
B. a test signal generator for providing bias test signals which, after prescribed amplification, produce beam currents corresponding to a standard gray video image of low intensity; and gain test signals which, after prescribed amplification, produce beam currents corresponding to a standard gray video image of intermediate intensity;
C. red, blue and green video amplifiers, each including:
 1. bias adjusting means responsive to a bias control quantity, and
 2. gain adjusting means responsive to a gain control quantity;
D. switching means for coupling said video signals or said test signals to the inputs of said video amplifiers, said bias and gain test signals being coupled during predetermined bias and gain test periods, respectively;

E. a multibeam cathode ray color display device including:
  1. a plurality of electron beam producing guns, each including a cathode, and
  2. a beam blanking grid,
    each gun being driven from the output of a corresponding video amplifier;
F. means for applying blanking potentials to said beam blanking grid during a portion of each test period;
G. a standard, including:
  1. means for producing red, blue and green current standards corresponding to the prescribed beam currents required for a gray image of low intensity, during bias test periods, and
  2. means for multiplying each of said current standards by a common electrical quantity, to produce red, blue and green current standards corresponding to the prescribed beam currents required for a gray image of intermediate intensity, during gain test periods;
H. beam current error detection means coupled to each cathode, comprising:
  1. means for obtaining two samples of the cathode current, taken during each of said test periods when a given test signal is applied to said video amplifier, one sample being taken when the beam is blanked and the other sample being taken when the beam is not blanked, the difference in said samples representing the beam current,
  2. means for storing the earlier cathode current sample for each test signal, and
  3. summation means for combining the later cathode current sample, the stored earlier cathode current sample, and the current standard for each test signal, in a sense to obtain an error signal indicating the difference between the beam current and the current standard during the bias test period and during the gain test period;
I. a plurality of control memories, including:
  1. bias memory means, coupled to said bias adjusting means of each video amplifier, for storing a bias control quantity, adjustable in response to said detected error signal obtained during said bias test period, for correction of said beam current toward said standard; and
  2. gain memory means,
    a. coupled to said gain adjusting means of each of said red and blue video amplifiers for storing a gain control quantity, adjustable in response to said detected error signal obtained during said gain test period for correction of said beam current toward said standard,
    b. coupled to said gain adjusting means of said green video amplifier and having a fixed gain control quantity;
J. means responsive to said error signal from said green beam current error detection means for deriving an electrical quantity proportional to the green beam current during gain test periods, and for coupling said electrical quantity to said standard to control said multiplication such that said green current standard is brought into equality with said green beam current; and
K. means for timing the recited operation to allow gain error and bias error measurements in test periods selected to permit an uninterrupted image display while achieving continuous correction.

9. Apparatus for achieving and maintaining gray scale tracking in a multibeam cathode ray display device which produces color images represented by detected video signals applied by a source thereof to video amplifiers applying color signals to the device, the gray scale being maintained despite fluctuations in the electrical characteristics of the display device and in the video-amplifiers, said apparatus comprising:
A. the cathode ray display device, including:
  1. a plurality of color guns for receiving respective ones of the color signals, said guns including cathodes for producing electron beam currents, the magnitudes of said currents being controlled by the color signals to effect production of the color images;
  2. beam-blanking grid means for blanking the beams produced by the guns when a blanking potential is applied thereto;
B. the video amplifiers, each including:
  1. a bias adjustment input included in each video amplifier to enable adjustment of the bias thereof,
  2. a gain adjustment input included in all but a selected one of the video amplifiers to enable adjustment of the gains thereof, the gain of said selected amplifier being fixed at a nominal value;
C. switching means coupling the video signal sources and the video amplifiers, said switching means interrupting application of the video signals to the amplifiers during alternately-occurring bias and gain test periods which are timed to avoid interference with the displayed image;
D. a test signal generator coupled to the inputs of the amplifiers for alternately applying a bias test signal and a gain test signal to the amplifiers during successive test periods, said bias test signal nominally effecting the production of a first set of electron beam currents of predefined low magnitudes, and said gain test signal nominally effecting the production of a second set of electron beam currents of predefined intermediate magnitudes;
E. means for producing a set of bias current standards and a set of gain current standards, said bias current standards being produced during each application of the bias test signal to the video amplifiers and corresponding to the predefined low magnitude beam currents, and said gain current standards being produced during each application of the gain test signal to the video amplifiers, said gain current standards having predefined current ratios identical to those of the bias current standards and having magnitudes established by a gain reference signal;
F. means for applying the beam blanking potential to the beam-blanking grid means during a portion of each test period;
G. a plurality of beam current error detectors, each coupled to a respective one of the color gun cathodes to determine, during each test period, the difference between the beam current produced by the gun and the corresponding current standard being produced, said error detectors each comprising:
  1. means for obtaining samples of first and second cathode currents produced by the respective gun during the test period, the first cathode current being produced when the beam currents are blanked and the second cathode current being produced when the beam currents are not blanked, the difference between said first and second cathode currents being the beam current produced by the gun during the test period;

2. means for storing the sample of the first cathode current;

3. summation means for combining the current standard and the samples of the first and second cathode currents and producing an error signal representing the difference between said current standard and said beam current;

H. a plurality of bias memories, each coupled to the bias adjustment input of a respective video amplifier and to the beam current error detector coupled to the cathode driven by the amplifier, each of said bias memories adjusting the bias of its respective amplifier in response to changes in a bias control level stored in the memory, said bias control levels changing in response to the respective error signals produced during successive bias test periods, to effect correction of the beam currents toward their predefined low magnitudes; and I. a gain reference for producing the gain reference signal, said gain reference being coupled to the beam current error detector coupled to the electron gun cathode driven by the selected amplifier, the magnitude of said gain reference signal being controlled in response to the error signal produced by the coupled error detector such that the current standard applied to said error detector during each gain test period is equal to the electron beam current produced by said gun; and J. a plurality of gain memories, each coupled to the gain adjustment input of a non-selected video amplifier and to the beam current error detector coupled to the cathode driven by the amplifier, each of said gain memories adjusting the gain of its respective amplifier in response to changes in a gain control level stored in the memory, said gain control levels changing in response to the respective error signals produced during successive gain test periods, to effect correction of the beam currents toward their predefined current ratios.

10. Apparatus as in claim 9 where said display device is a single cathode-ray-tube.

11. Apparatus as in claim 10 where the color signal produced by each video amplifier is applied to the respective cathode in the display device.

12. Apparatus as in claim 10 where the beam current error detector coupled to each gun's cathode comprises:
A. a node for summing currents;
B. means supplying said first and second cathode currents to the node;
C. a current sink electrically connected to the node for withdrawing from the node a current of magnitude equal to said first cathode current;
D. means for withdrawing from the node the current standard corresponding to the beam current that should be produced by the respective gun, during the test period; and
E. means for sensing the current summation formed at the node and producing the error signal.

13. Apparatus as in claim 12 where the beam current error detector coupled to each gun's cathode further comprises low impedance means for coupling to the cathode the output of the video amplifier producing the respective color signal.

14. Apparatus as in claim 10 and further including means for extending the beam-current control range beyond that provided by the video amplifiers, comprising:
A. means for sensing the DC levels of the output signals produced by the video amplifiers; and
B. means for applying a beam-current-reducing potential to the grid means in the display device when the DC level of the output signal produced by any of the amplifiers reaches its beam-current-reducing limit.

15. Apparatus for achieving and maintaining a predetermined relationship between the magnitude of a detected video signal applied to a video amplifier driving a single beam cathode ray display device and the magnitude of the beam current, despite fluctuations in the electrical characteristics of said display device and the video amplifier, comprising:

A. a source of the detected video signal;
B. a test signal generator for providing a bias test signal which, after prescribed amplification, produces a beam current corresponding to a video image of low intensity; and a gain test signal which, after prescribed amplification, produces a beam current corresponding to a video image of intermediate intensity;
C. the video amplifier including:
  1. a bias adjustment means responsive to a bias control quantity, and
  2. a gain adjustment means responsive to a gain control quantity,
D. switching means for coupling said video signal or said test signals to the input of said video amplifier, said bias and gain test signals being coupled during predetermined bias and gain test periods, respectively;
E. the cathode ray display device including:
  1. an electron beam producing gun, including a cathode, and
  2. a beam blanking grid,
    said gun being driven from the output of the video amplifier;
F. means for applying a blanking potential to said beam blanking grid during a portion of each test period;
G. a standard for producing current standards corresponding to the prescribed beam current required for an image of low intensity during bias test periods, and for an image of intermediate intensity during gain test periods;
H. beam current error detection means, coupled to the cathode, comprising:
  1. means for obtaining two samples of the cathode current, taken during each of said test periods when a given test signal is applied to said video amplifier, one sample being taken when the beam is blanked and the other sample being taken when the beam is not blanked, the difference in said samples representing the beam current;
  2. means for storing the earlier cathode current sample for each test signal; and
  3. summation means for combining the later cathode current sample, the stored earlier cathode current sample, and the current standard for each test signal, in a sense to obtain an error signal indicating the difference between the beam current and said current standard during the bias test period and during the gain test period;
I. a control memory, coupled to the video amplifier, said control memory including:
  1. bias memory means, coupled to said bias adjusting means of the video amplifier, for storing a bias control quantity, adjustable in response to said detected error signal obtained during said bias test period, for correction of said beam current toward said standard; and 2. gain memory means, coupled to said gain adjusting means of the video amplifier, for storing a gain control quantity, adjustable in response to said detected error signal obtained during said gain test period, for correction of said beam current toward said standard; and J. means for timing the recited operation to allow gain error and bias error measurements in test periods selected to permit an uninterrupted image display while achieving continuous correction.

* * * * *